US006535850B1

United States Patent
Bayya

(10) Patent No.: US 6,535,850 B1
(45) Date of Patent: Mar. 18, 2003

(54) SMART TRAINING AND SMART SCORING IN SD SPEECH RECOGNITION SYSTEM WITH USER DEFINED VOCABULARY

(75) Inventor: Aruna Bayya, Irvine, CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/522,448

(22) Filed: Mar. 9, 2000

(51) Int. Cl.⁷ .................. G10L 15/06; G10L 15/10
(52) U.S. Cl. ............. 704/239; 704/243; 704/254
(58) Field of Search ............... 704/231, 236, 704/238, 243, 245, 251, 252, 253, 254, 239

(56) References Cited

U.S. PATENT DOCUMENTS

| | | | |
|---|---|---|---|
| 4,718,088 A | | 1/1988 | Baker et al. |
| 4,914,703 A | * | 4/1990 | Gillick ............... 704/239 |
| 5,452,397 A | | 9/1995 | Ittycheriah et al. |
| 5,475,792 A | | 12/1995 | Stanford et al. |
| 5,664,058 A | | 9/1997 | Vysotsky |
| 5,712,957 A | * | 1/1998 | Waibel et al. ........... 704/240 |
| 5,754,977 A | | 5/1998 | Gardner et al. |
| 5,774,860 A | | 6/1998 | Bayya et al. |
| 5,806,025 A | | 9/1998 | Vis et al. |
| 5,963,906 A | | 10/1999 | Turin |
| 6,138,095 A | * | 10/2000 | Gupta et al. ........... 704/234 |
| 6,182,037 B1 | * | 1/2001 | Maes ................. 704/245 |
| 6,185,530 B1 | * | 2/2001 | Ittycheriah et al. ...... 704/243 |
| 6,223,155 B1 | * | 4/2001 | Bayya ................ 704/243 |
| 6,230,129 B1 | * | 5/2001 | Morin et al. ........... 704/254 |
| 6,292,775 B1 | * | 9/2001 | Holmes ............... 704/209 |
| 6,377,921 B1 | * | 4/2002 | Bahl et al. ............ 704/243 |
| 6,421,640 B1 | * | 7/2002 | Dolfing et al. ......... 704/236 |
| 6,453,293 B1 | * | 9/2002 | Kammerer ............. 704/254 |

\* cited by examiner

*Primary Examiner*—Marsha D. Banks-Harold
*Assistant Examiner*—Martin Lerner
(74) *Attorney, Agent, or Firm*—Seed IP Law Group PLLC

(57) ABSTRACT

In a speech training and recognition system, the current invention detects and warns the user about the similar sounding entries to vocabulary and permits entry of such confusingly similar terms which are marked along with the stored similar terms to identify the similar words. In addition, the states in similar words are weighted to apply more emphasis to the differences between similar words than the similarities of such words. Another aspect of the current invention is to use modified scoring algorithm to improve the recognition performance in the case where confusing entries were made to the vocabulary despite the warning. Yet another aspect of the current invention is to detect and warn the user about potential problems with new entries such as short words and two or more word entries with long silence periods in between words. Finally, the current invention also includes alerting the user about the dissimilarity of the multiple tokens of the same vocabulary item in the case of multiple-token training.

11 Claims, 26 Drawing Sheets

SMART TRAINING AND SMART SCORING IN SD SPEECH RECOGNITION SYSTEM WITH USER DEFINED VOCABULARY

BACKGROUND OF THE INVENTION

1. Field of the Invention

This invention relates to speech recognition and training systems. More specifically this invention relates to Speaker-Dependent (SD) speech recognition and training systems which include means for identifying confusingly similar words during training and means for increasing discrimination between such confusing similar words on recognition.

2. Related Art

A SD system offers flexibility to the user by permitting the introduction of new words into the vocabulary. It also allows vocabulary words from different languages to be included. However, the advantages of user-defined vocabulary and language independence can cause performance degradation if not implemented properly. Allowing a user-defined vocabulary introduces problems due to the flexibility in selecting the vocabulary words. One of the major problems encountered in allowing the user-defined vocabulary is the acoustical similarity of vocabulary words. For example, if "Rob" and "Bob" were selected as vocabulary words, the reliability of the recognition system will decrease.

When the user is given the freedom to choose any vocabulary words, the tendency is to select short words, which are convenient to train but produce unreliable models. Due to the limited training data (one token), the longer the word is, the more reliable the model will be. Finally, when the user enters multiple-word phrase for a vocabulary item, the variation in the length of silence or pause between the words is critical to the success of the recognition system. In unsupervised training, there is no feedback from the system to the user during the training phase. Hence, the models created from such training do not avoid the above identified problems.

To alleviate these problems, a smart/supervised training system needs to be introduced into a SD recognition system particularly if it uses word-based models.

Many methods of SD speech training are present in the related art. For example U.S. Pat. No. 5,452,397 to Ittycheriah, et al., incorporated herein by reference, assumes multiple-token training and describes a method of preventing the entry of confusingly similar phrases in a vocabulary list of a speaker-dependent voice recognition system. The first token of the word/phrase to be added to the vocabulary list, is used to build a model for that word/phrase. Then, the second token (a repetition of the same word/phrase) is compared with the new model added to the vocabulary and also with previously existing models in the vocabulary list. The scores of the existing models are weighted slightly higher than that of the new model. If the second token compares more closely with the an existing model than the new model, the new word/phrase is declared to be confusingly similar to one of the existing vocabulary items then the new model is removed. The user is then asked to select another word/phrase for training. Since this method requires multiple tokens, it is not suitable for a SD system, which requires only a single token for training.

U.S. Pat. No. 5,754,977 to Gardner, et al., incorporated herein by reference, uses a distance value to measure the closeness of the word/phrase to be added with any of the existing vocabulary items. All the vocabulary items are sorted in the order of closeness to the new pattern/model. Then, an Euclidean distance value is computed between the new model and the top entry in the sorted list. If the distance falls below certain predetermined threshold, then the user is warned about the acoustic similarity of the word/phrase to be added with one of the existing vocabulary items and the user is requested to make another entry. Although this approach can be used in a SD system with 1-token training, the method is not very reliable. Since the distribution of the distance values will change significantly from user to user, it is very difficult to determine a reliable threshold value. Even when there is an ability to adjust or change the threshold value from user to user, a priori information such as utterance magnitude, on the distance/score distribution is still required for changing the threshold to a meaningful value.

U.S. Pat. No. 5,664,058 to Vysotsky, incorporated herein by reference, is a speech recognizer training system using one or a few isolated words which are converted to a token. Vysotsky performs multiple tests to determine whether a training utterance is to be accepted or rejected to prevent the user from adding a new voice message, which is similar to a voice message, the recognizer has previously been trained to recognize and insures a consistent pronunciation for all templates corresponding to the same voice message. This approach also requires two or more training tokens to perform these tests. The tests use a distance measure as a criterion for determining the closeness of the new token to the previously stored templates. Even though this approach is more robust than the other two methods, it requires more tokens and more tests than the other methods described above. This technique also uses absolute thresholds, which may not necessarily be uniform across different speakers. Unlike most of the current SD systems, the matching in this approach is performed by Dynamic Time Warping (DTW) which is used to match utterances of a different length than the test speech pattern. Hence the criteria used in this approach are not be directly applicable to systems that use HMM for modeling the speech.

Most of the solutions proposed in the related art assume that more than one token is available during the training phase, for building the models for the vocabulary words. The SD speech recognition system of the present invention requires only one token per vocabulary item for training and since the models built from one-token training are not very robust, performance is improved significantly by identifying and indicating to the user the problem words during the training phase, i.e. smart training.

Also, some of the previous solutions rely on absolute score thresholds to determine the closeness of words. Unfortunately, the same threshold can not be used for every user. Hence, the training can not be completely unsupervised.

Finally, the previous solutions avoid adding only acoustically similar words to the vocabulary. None of the above systems present a solution to resolving entry of confusable words, that is words which are acoustically similar. They fail to address several other problems encountered in training.

The present invention describes a solution for each of the problems described above that cause various degradations in the performance of SD speech recognition systems by using a confidence measure based smart training system which avoids or compensates for similar sounding words in vocabulary. Using duration information, the training process cautions the user about the entries to vocabulary that may be likely sources of frequent errors. Finally, based on the output of smart training, a smart scoring procedure is included in the method described herein to improve the recognition performance in the event the user chooses to include similar sounding words in the vocabulary.

The invention improves the performance and reliability of the SD speech recognition system over the related art systems by avoiding similar sounding entries to the vocabulary during the training, avoiding very short words and other utterances that are likely to cause recognition errors, suggesting alternative solutions, and in the event of user insistence to include similar sounding words in the vocabulary, augments the recognition of such similar sounding words by using a confidence measure instead of absolute scores to determine the acoustic similarity of the vocabulary items and modifies the scoring algorithm during recognition. The present invention also uses additional information such as duration of the utterance and the number of words in a vocabulary item. The smart training process described herein can be applied either to the single-token training or to the multiple-token training.

SUMMARY OF THE INVENTION

A complete SD speech recognition system includes training as well as recognition components. Since the user is required to train every vocabulary item, the training process should be simple and user-friendly. As a result, the user is asked to say each vocabulary item only few (one, two or three) times. Training in the present invention requires only one token per vocabulary item. Several approaches have been proposed for SD speech recognition in which the available training data is severely limited. The present invention uses a statistical approach known as Hidden Markov Modeling (HMM). In a statistical approach, it is assumed that the speech signal can be characterized by a random process in the given feature space which in this case is the spectral domain or space of cepstral vectors. The training process can be viewed as estimating all the parameters describing this random process for each word in the vocabulary and the recognition or matching process can be viewed as identifying which of these random process is most likely to produce the test token. A probabilistic measure is used to determine this closeness.

A general approach to isolated-word speech recognition using statistical methods is depicted in the flow diagram of FIG. 1. As can be noted from the block diagram of FIG. 1, the basic components of a speech recognition system include a front-end processor 1, a buffer for storing processed speech, 1a', a training module 2 and a recognition module 3. The front-end processor includes a Pre-processing module 1a which produces processed speech and a feature extraction module 1b for producing a feature vector 1c for digital speech input. The feature vector 1c is common input to both the training module 2 and the recognition module 3. The training module 2 has an estimating module 2a for estimating model parameters and a storage medium 2c for storing such model parameters on a storage medium 2b for subsequent retrieval and evaluation. The recognition module 3 includes a similarity evaluation module 3a, which computes score measurement and decision logic 3b which uses the score to recognize a word I.D. 3c. The representation of speech by a concise set of parameters is the most crucial step of the speech recognition process. Though many such representations exist, a technique, well known to those skilled in the art, known as Linear Prediction Coding (LPC) is used in the present invention.

It should be noted that the generalized system described above comprises unsupervised training and recognition modules. The introduction of smart training in the SD system improves the recognition performance by eliminating the problems introduced by unsupervised training. One aspect of the current invention is to detect and warn the user about the similar sounding entries to vocabulary. Another aspect of the current invention is to use modified scoring algorithm to improve the recognition performance in the case where confusing entries were made to the vocabulary despite the warning. Yet another aspect of the current invention is to detect and warn the user about potential problems with new entries such as short words and two to three word entries, with long silence periods in between words. Finally, the current invention also includes alerting the user about the dissimilarity of the multiple tokens of the same vocabulary item in the case of multiple-token training.

Thus the present invention permits the addition of confusingly, similar words to be entered into the vocabulary and uses a refined detection algorithm to distinguish between such similar words. In addition, the present invention detects long pauses between words and alerts the user. If the words are added to the vocabulary, the pause is normalized.

DESCRIPTION OF THE SPECIFIC EMBODIMENT

As noted above, the present invention uses a statistical approach known as Hidden Markov Modeling (HMM). In such a statistical approach, it is assumed that the speech signal can be characterized by a random process in the given feature space which in this case is the spectral domain or space of cepstral vectors.

Training is process of estimating all of the parameters describing this random process for each word in the vocabulary and the recognition or matching process can be viewed as identifying which of these random process is most likely to produce the test token to be recognized. A probabilistic measure is used to determine this closeness.

Figure 1:
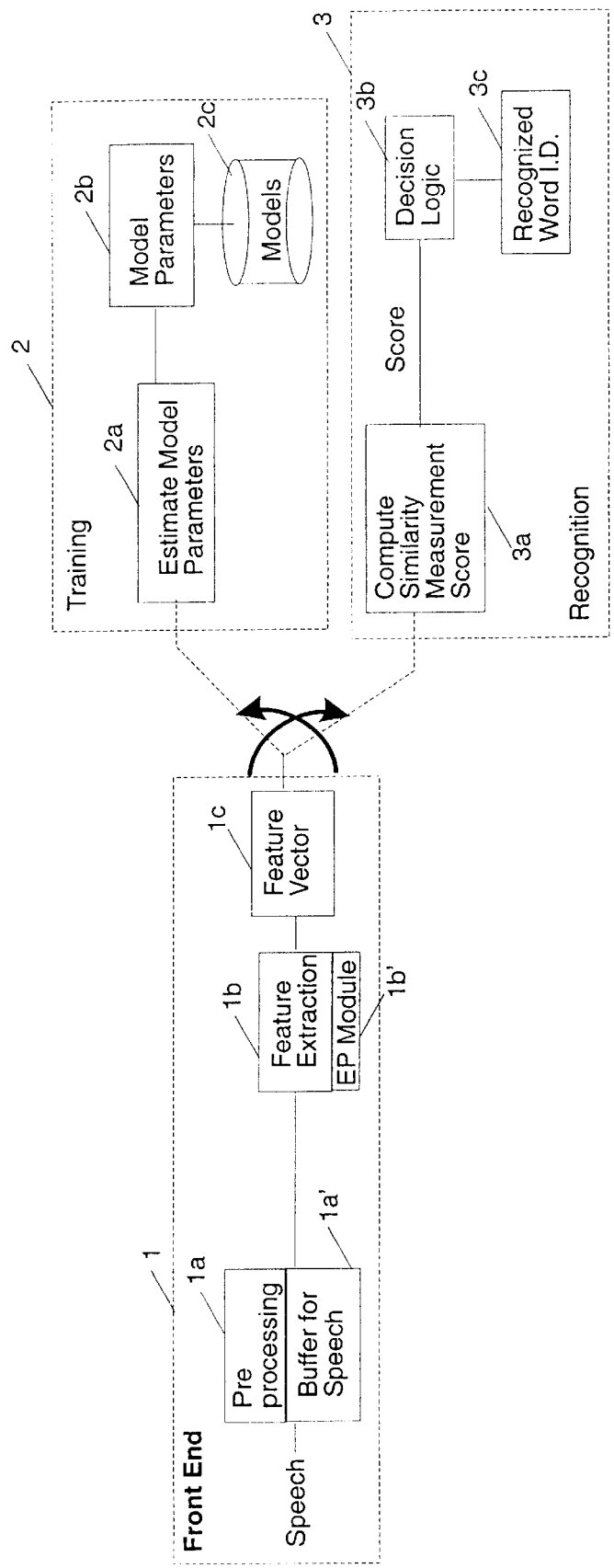
FIG. 1 is block diagram of a typical speech recognition system
Figure 2:
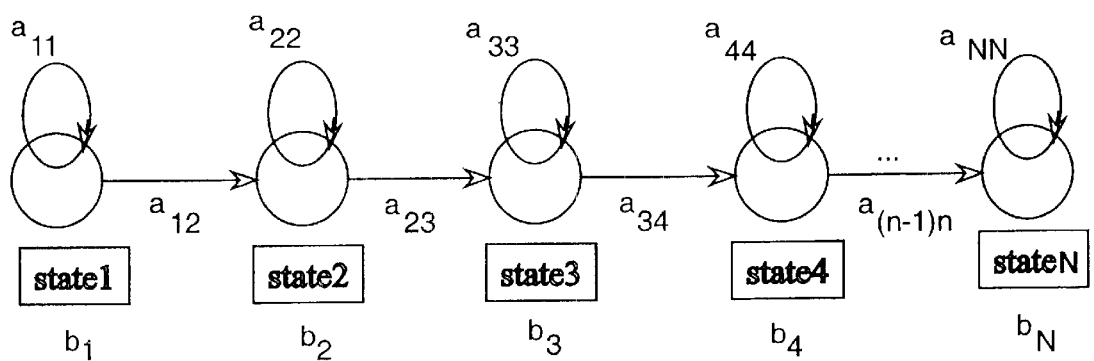
FIG. 2 is a schematic of a Hidden Markov Model structure

The representation of speech by a concise set of parameters is the most crucial step of the speech recognition process and the representation of speech by a such parameters in the present invention is achieved using Linear Prediction Coding (LPC) and is well known to those skilled in the art. The Hidden Markov Model (HMM) or Source is capable of characterizing the speech signal very well in the feature spaces that best represent the acoustic properties of speech. Hence, the preferred SD recognition system described herein uses Hidden Markov Models (although other systems could be used) to represent the acoustic event that produces the vocabulary word. In other words, each vocabulary word is represented by a model as shown in FIG. 2, where each state of the Hidden Markov process represents approximately a sound unit or cluster of sound units in the vocabulary word. For example the word "Bob" would have three states corresponding to each sound associated with the characters in the word. The model is completely described by the number of states N, the transition probabilities, $a_{ij}$ (from state i to state j) and the observation probabilities $b_{it}$ for each state i at any time instant t. In FIG. 2, $a_{ii}$ indicates the probability of remaining in State i and $a_{ij}$ indicates the transition probability from state i to the next state and $b_j$ indicates the probability of a speech frame being produced by a given state j.

The training process is equivalent to estimating these parameters for each entered vocabulary word from the training data. That is, the training process determines the probability the transition from one state to another. The recognition process is equivalent to computing a likelihood score, i.e. the logarithm of the probability of observing the feature vector for the test token, given an HMM for a vocabulary word. Then when a comparison of the speech signal features with the stored parameters is made, the word with the best likelihood score is declared as the recognized word.

The underlying theory of HMM and its application to speech recognition are known to those skilled in the art. Following the same notation as in many publications available to those skilled in the art, an HMM for any vocabulary word is defined as $$\lambda = \{N, \vec{A}, \vec{B}, \vec{\pi}\}$$

where N is the number of states in the model, A is the transition probability matrix, $\pi$ is the vector of initial state probabilities and B is the observation density function which in this case is a multiple-mixture, multivariate Gaussian distribution function where A and B are defined as follows:

$$A = \lfloor a_{ij} \rfloor \quad i, j = 1, 2, \ldots N$$

$$B = [b(\vec{o}_t)] \quad j = 1, \ldots N, t = 1 \ldots T$$

$$b_j(\vec{o}_t) = \sum_{m=1}^{M} c_{mj} b_{mj}(\vec{o}_t) \quad j = 1, \ldots N, m = 1, \ldots M$$

and $$b_{mj}(\vec{o}_t) = \frac{1}{\sqrt{2\pi |C|}} \exp\left\{-\frac{1}{2}(\vec{o}_t - \vec{\mu}_{mj})^T C^{-1}(\vec{o}_t - \vec{\mu}_{mj})\right\}$$

During the training stage, the model parameters including transition probabilities $a_{ij}$ for $i, j=1,2, \ldots N$, the mixture weights $c_{mj}$ for $j=1,2, \ldots N, m=1,2, \ldots M$, the mean vector $\mu_{mj}$ for $j=1,2, \ldots N, m=1,2, \ldots M$, and the Covariance matrix, C are estimated from the training data where the number of states N and the number of mixtures M are determined by heuristics. (During the recognition stage, these parameters are used to compute the likelihood score for each model).

The training data required to accurately estimate the model parameters is proportional o the number of parameters or the complexity of the model. Due to the availability of limited-training data (1–2 tokens per word) in a SD recognition system and due to the imitation imposed by some systems on memory and computational resources, the model architecture in SD recognition may be simplified from the full-blown HMM architecture to that noted below.

In particular, $b_j(o_t)$ known as the observation density function is assumed to have one Gaussian distribution function instead of a mixture of Gaussian functions. Hence M=1 and $c_{mj}=1$ for each state j. The elements of the feature vector are assumed to be independent and hence C will be an identity matrix. This will reduce the above set of equations to the following simplified model:

$$A = \lfloor a_{ij} \rfloor$$

$$B = [b_j(o_t)]$$

and $$b_j(o_t) = \frac{1}{\sqrt{2\pi K}} \exp\left\{-\frac{1}{2}(o_t - \mu_j)^T(o_t - \mu_j)\right\}$$

In this simplified model, only $a_{ij}$ and $\mu_j$ need to be estimated and the likelihood scores are computed using this simplified model. A simple and efficient algorithm is therefore available for estimation of the parameters of the simplified model from only one token of the vocabulary word in the present invention.

Figure 3:
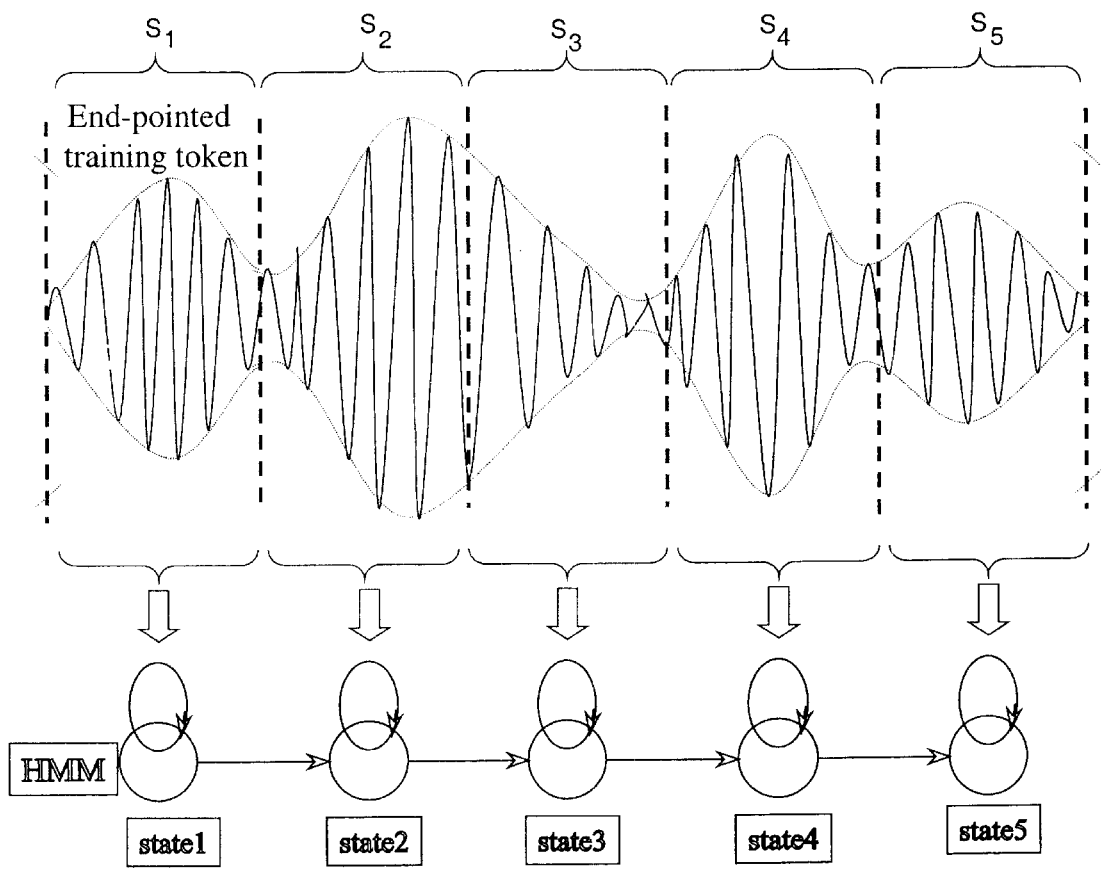
FIG. 3 is a schematic of segmentation of a training token used to build the HMM

A feature vector $\vec{o}_t$ is computed for each frame of speech (e.g. every 20 to 30 milliseconds). After feature vectors in all the frames in the end-pointed utterance are collected, the mean vectors and transition probabilities are computed. Since only one token is available, a reasonably good estimate can be obtained by uniformly segmenting the sequence of feature vectors and approximating each segment as one state in the HMM model as shown in FIG. 3, where a Uniform segments S1, S2, S3, S4 and S5 are used for a HMM with 5 states for example.

Then the means and transition probabilities can be estimated as $$\mu_j^i = \frac{1}{S_j} \sum_{t=1}^{S_j} o_{t+S_{j-1}}^i \quad \text{for } i = 1, 2, \ldots K \text{ and } j = 1, 2, \ldots N$$

$$a_{jj+1} = 1/S_j$$

and $$a_{jj} = 1 - a_{jj+1}$$

where $S_j$ is the number of feature vectors in state j.

Figure 7A:
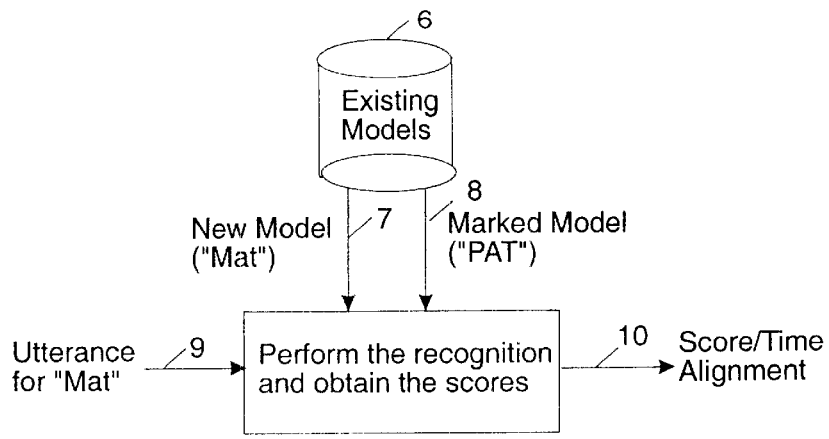
FIG. 7A is a block diagram of Virterbi alignment of acoustically similar words during training
Figure 7B:
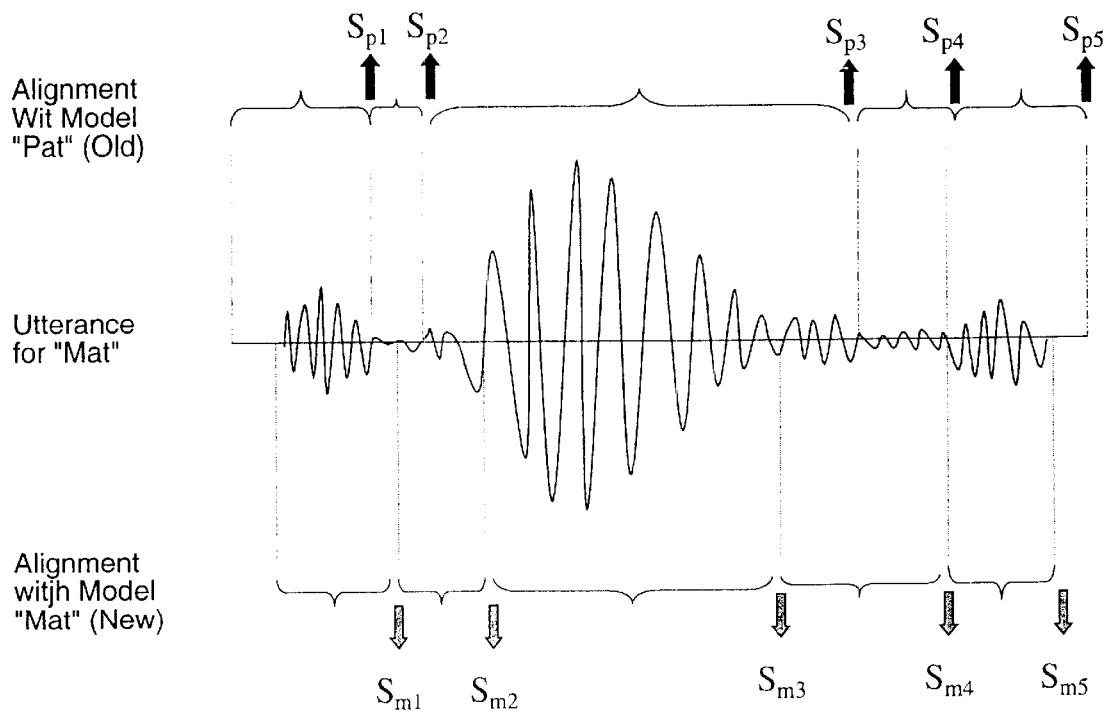
FIG. 7B is a schematic of Viterbi alignment of acoustically similar words during training

Based on the performance of the system, these estimates model the utterance sufficiently well. However, in case of poor estimates, the best state sequence/alignment can be computed by using the Viterbi alignment procedure (as illustrated in FIG. 7B), which finds the optimum distribution of feature vectors among the states. Then the above set of equations is used to re-compute $a_{ij}$ and $\mu_j$ s. This process can be repeated till some error criterion are satisfied.

Figure 4:
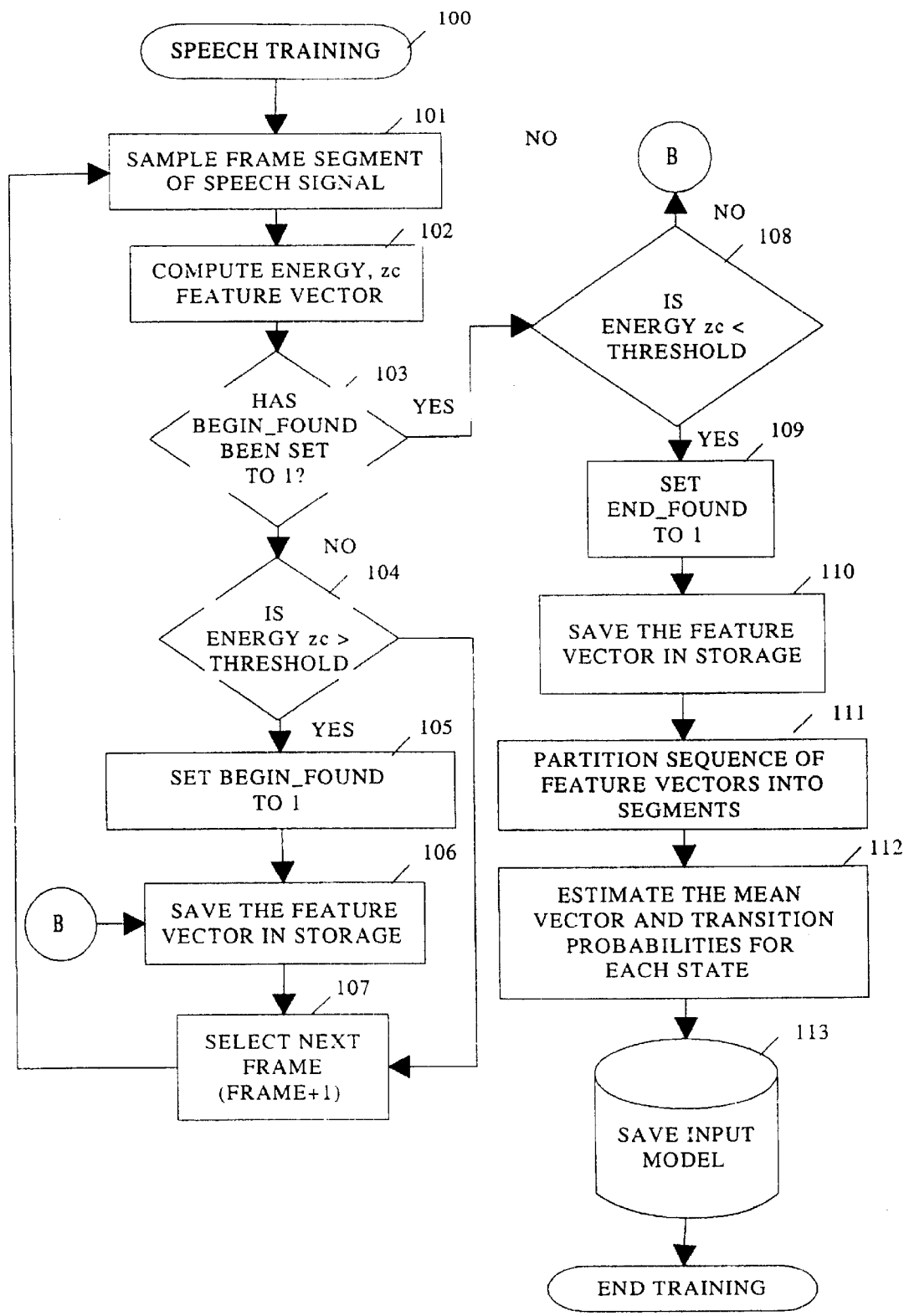
FIG. 4 is a flow diagram of the training of generalized SD speech recognition system

The training procedure for a single token as implemented in the current system is generally depicted in the flow diagram of FIG. 4. The input to the training module 2 is a spoken utterance in digitized speech signal form. The commencement of speech training, step 100, commences with the sampling of the speech signal in the form of a frame or a window in time, step 101. The energy and feature vector is computed and evaluated against an energy threshold which may be established at any desired level preferably above ambient noise in order to detect the beginning of speech, step 102. The system checks to determine if the beginning of speech has been detected by examining a Begin_Found parameter for either a 1 or a 0, step 103. If speech has not been previously detected, then the energy threshold is checked to determine if it exceeds a threshold level, step 104. If it does, a Begin_Found variable is set to 1 and the frame count for the zero crossing point is saved, step 105. The system also saves the feature vector for the frame, step 106 and the next frame is selected, step 107.

If the Begin_Found variable was previously set to 1, step 103 then the energy level is tested to see if it has fallen below a given level, step 108. If it has, then the end of speech has been detected. In such systems, the system sets frame count ahead of actual speech to ensure that the beginning of speech will be detected. Similarly, the system listens for many frames following the detection of silence to ensure that the silence is not simply a pause in speech. This technique is well known and it is assumed that when the energy falls below a certain threshold for the purposes of this system that it is at the end of speech. If the end of speech is not detected, then the feature vector is saved, step 106 and the next frame is selected, step 107 and the process begins anew at step 101. If the end of speech is detected, step 108 due to a low threshold, the End_Found variable is set to 1, step 109 and the Feature Vector is saved in storage, step 110, the sequence of feature vectors are partitioned into segments, step 112 and the mean vector and transition probabilities for each state are estimated, step 113. The Input Model is then saved, step 113.

The output of the training module 2 therefore is a model representing a vocabulary word. A model consists of a set of mean vectors and transition probabilities, which are computed from the feature vectors Ic. Each frame of speech is selected to be a 30 ms window, shifted in 10 ms increments, however, other time periods may be chosen for any given implementation dependent on environmental and specific application needs. A frame count is maintained to determine the beginning and end of various duration periods used in the system. As noted above the speech samples collected in the speech buffer 1a' are fed (one frame at a time) to the feature extraction module 1b which computes the feature vector 1c that is used in estimating the model parameters 2b. The feature extraction module 1b also computes the energy value required for determining the beginning and the end points of speech. The energy value input to the EP module 1b' of the feature extraction module 1b, sets the variables Begin_Found and End_Found to 1, to designate the beginning and ending of speech. If the Bein_Found flag is set to 1, the feature vector 1b associated with the then current frame is stored in memory and the next frame of speech consisting of 20 ms of the end of the previous frame (overlap) and 10 ms of new speech samples (shift) is selected. Once the end of speech is found the end of speech flag (End_Found) is set to 1, the saved sequence of feature vectors are partitioned into N segments where N is the number of states. Then for each segment, which in this case represents a state, the mean vector and transition probabilities are estimated.

The means and transition probabilities are estimated as follows:

$$\overline{c}_j(k) = \frac{1}{S_j}\sum_{t=1}^{S_j} c_{t+S_{j-1}}(k) \quad \text{For } k=1, 2, \ldots K \text{ and } j=1, 2, \ldots N$$

$$a_{j,j+1} = 1/S_j$$

and for i=1, 2, . . . N and j=1, 2, . . . N $$a_{jj} = 1 - a_{j,j+1}$$

where $S_j$ is the number of feature vectors in state j, $\{c(k)\}$ is the feature vector, $\{\overline{c}(k)\}$ is the mean vector, K is the length of the feature vector, $a_{ij}$ is the transition probability from state 'i' to state 'j'.

The input to the recognition module is spoken utterance in digitized speech signal form. The output from the recognition module is either a word ID indicating the identity of the spoken utterance or a message saying that the spoken utterance is rejected.

Figure 5A:
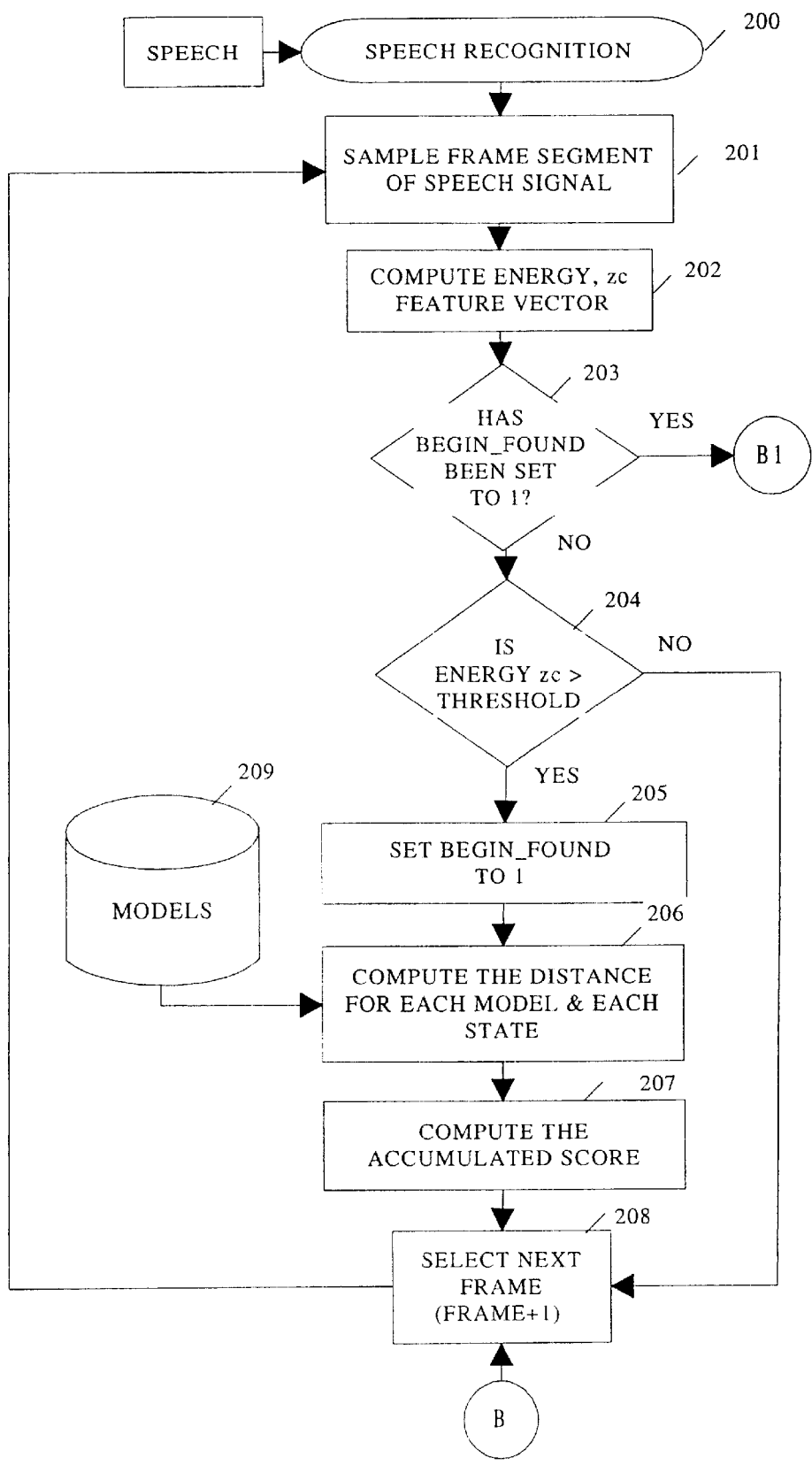
FIGS. 5A–5C are a flow diagram of the SD speech recognition system
Figure 5B:
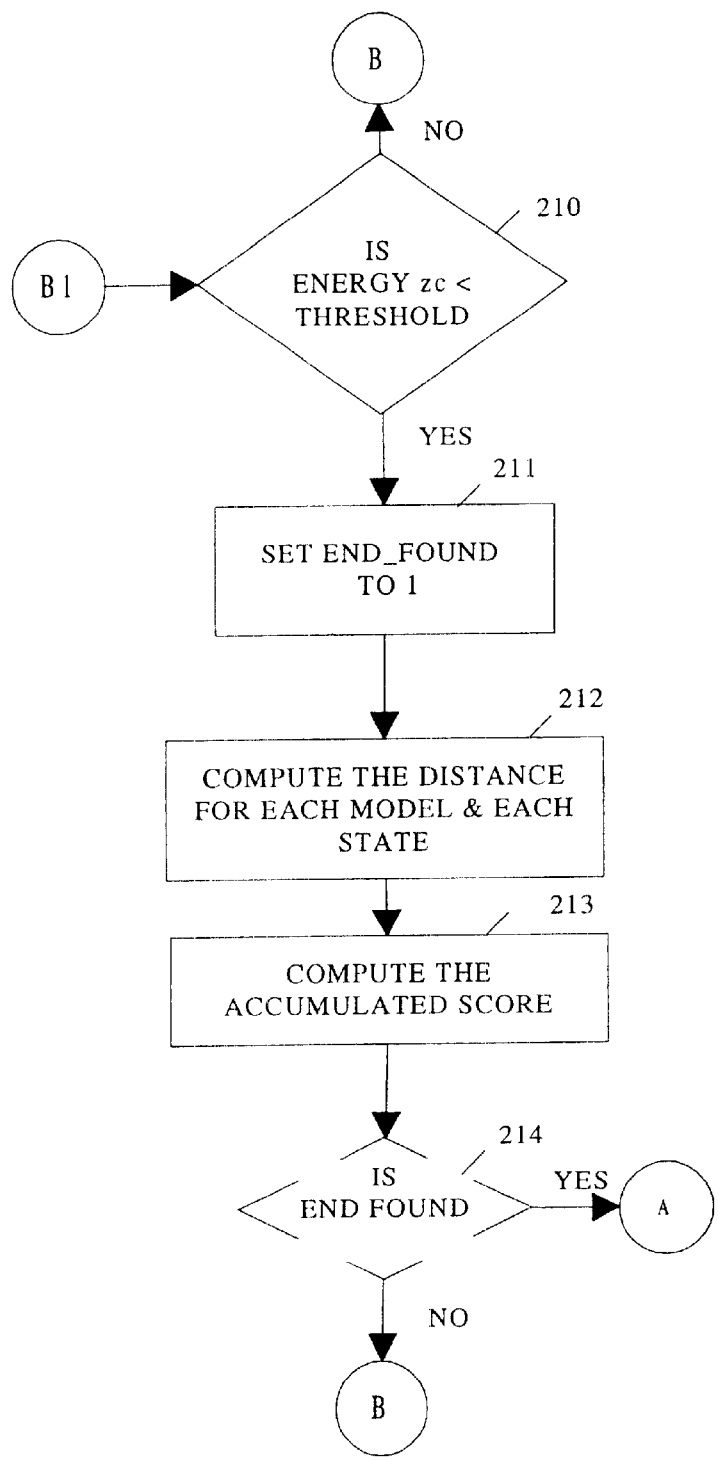
Figure 5C:
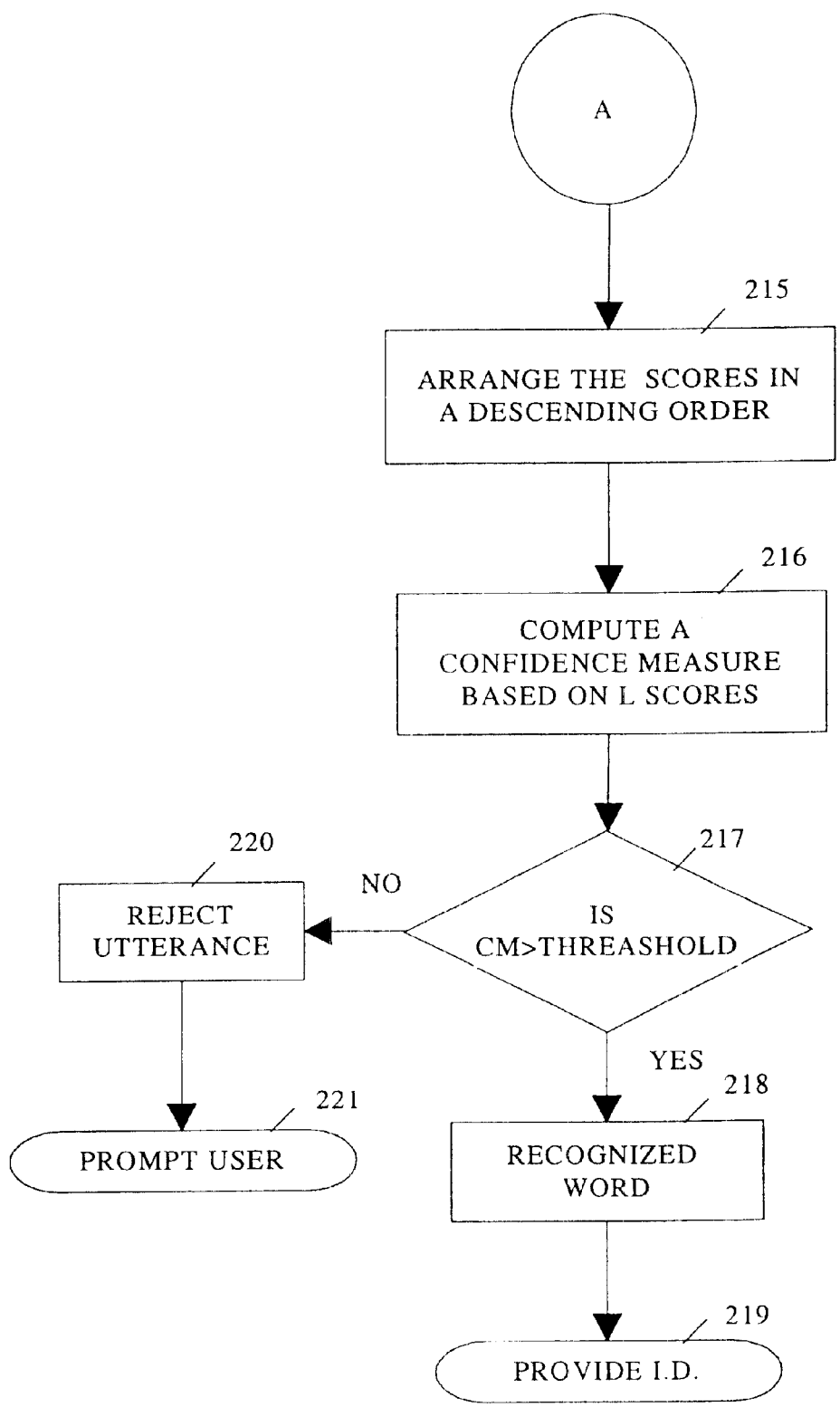
Figure 6A:
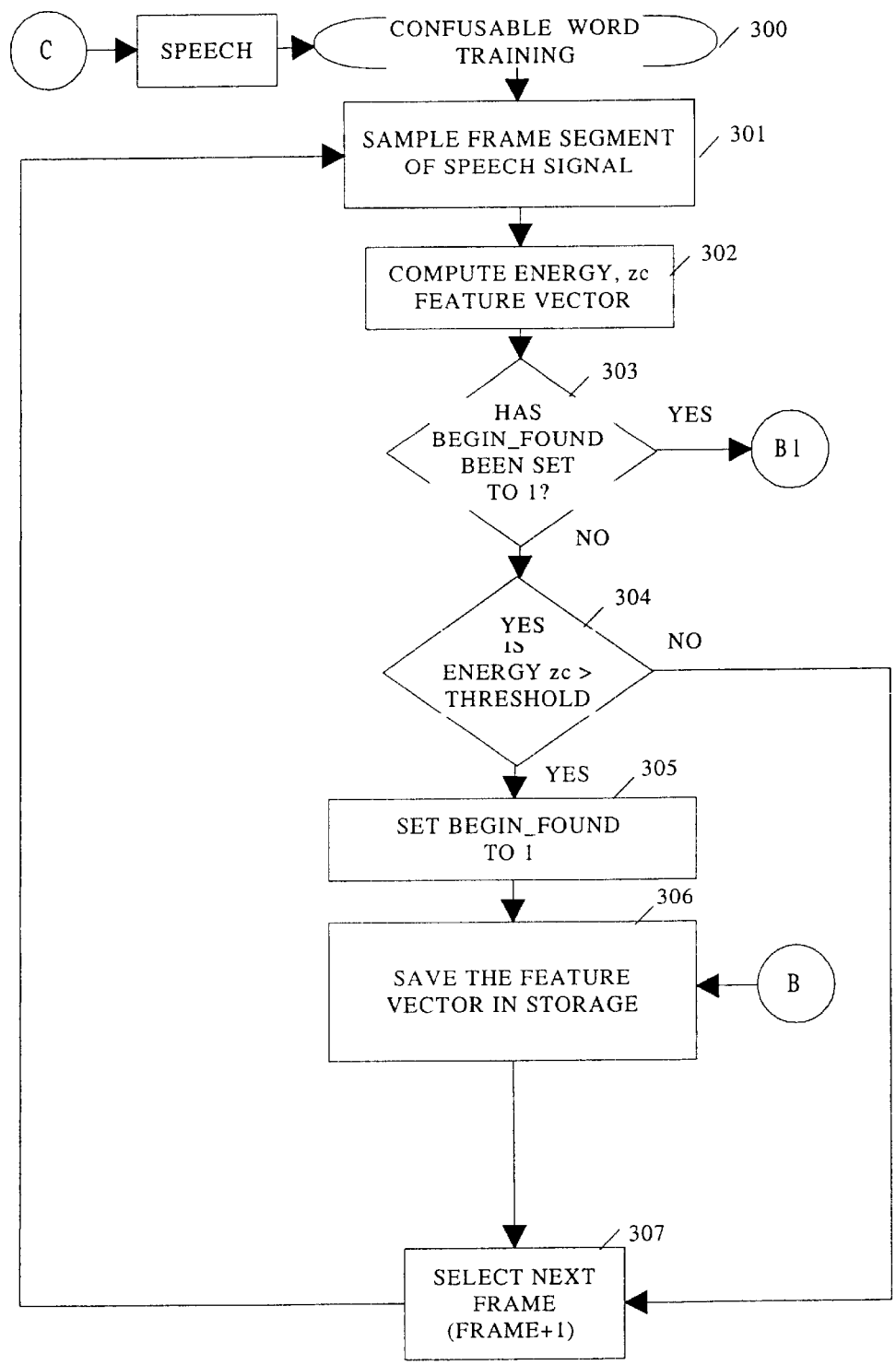
FIG. 6A–6D are a flow diagram of smart training for a confusable word vocabulary item
Figure 6B:
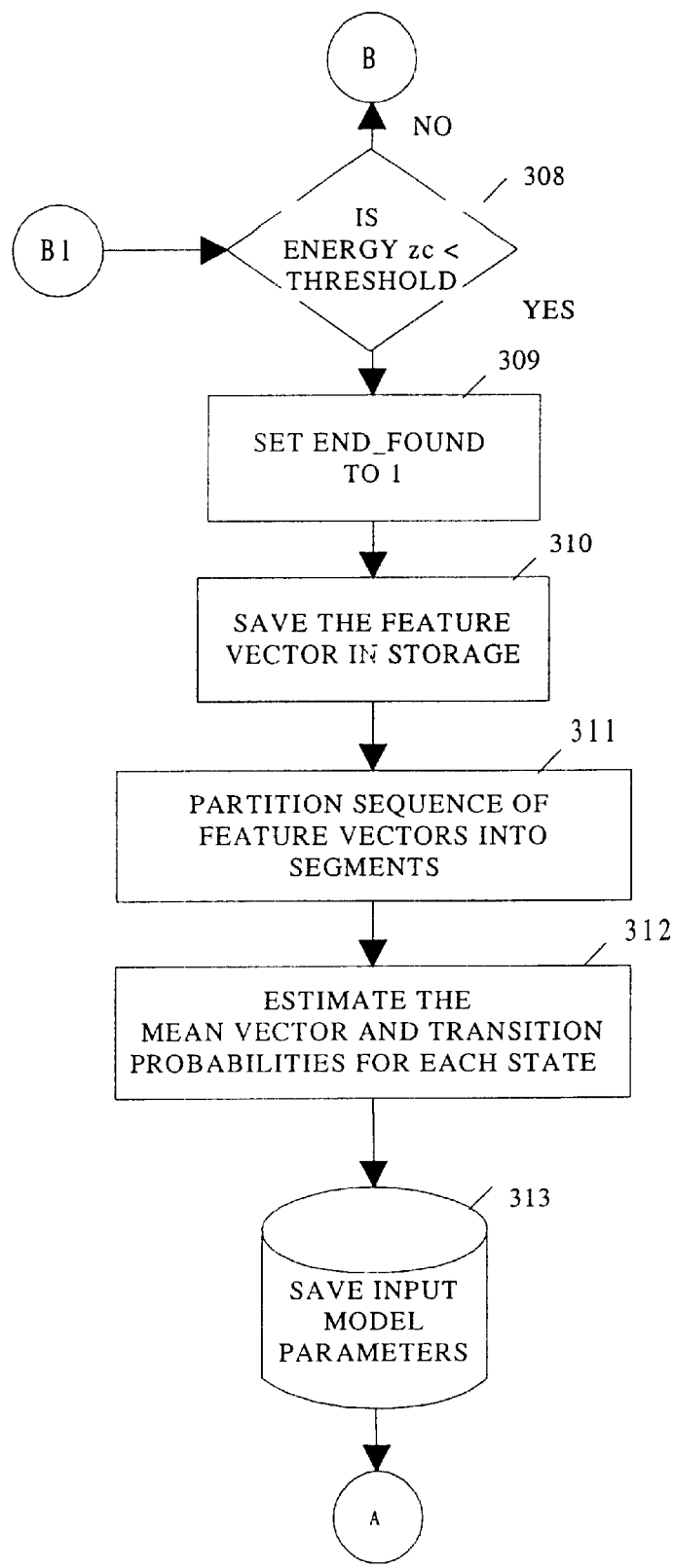
Figure 6C:
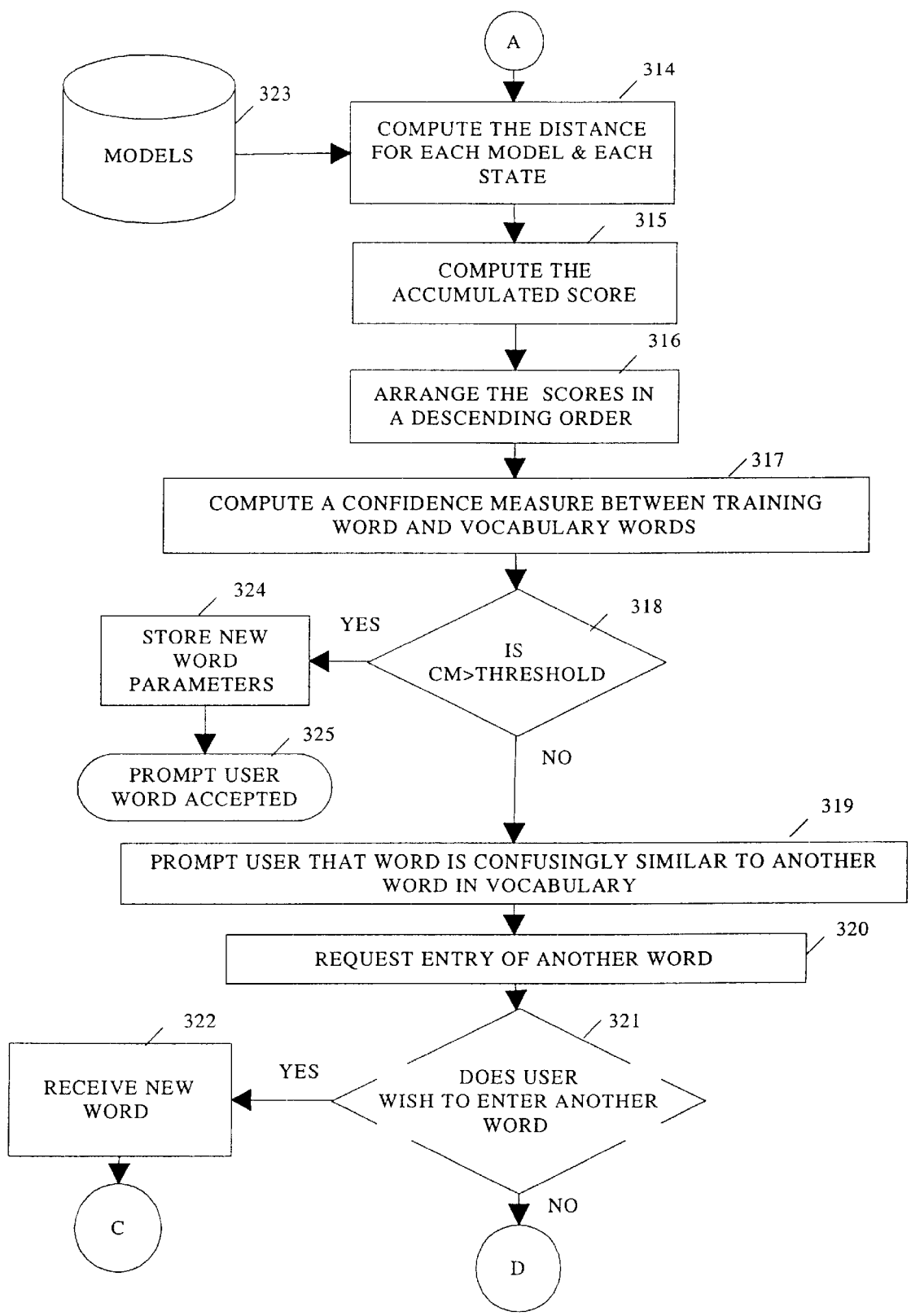
Figure 6D:
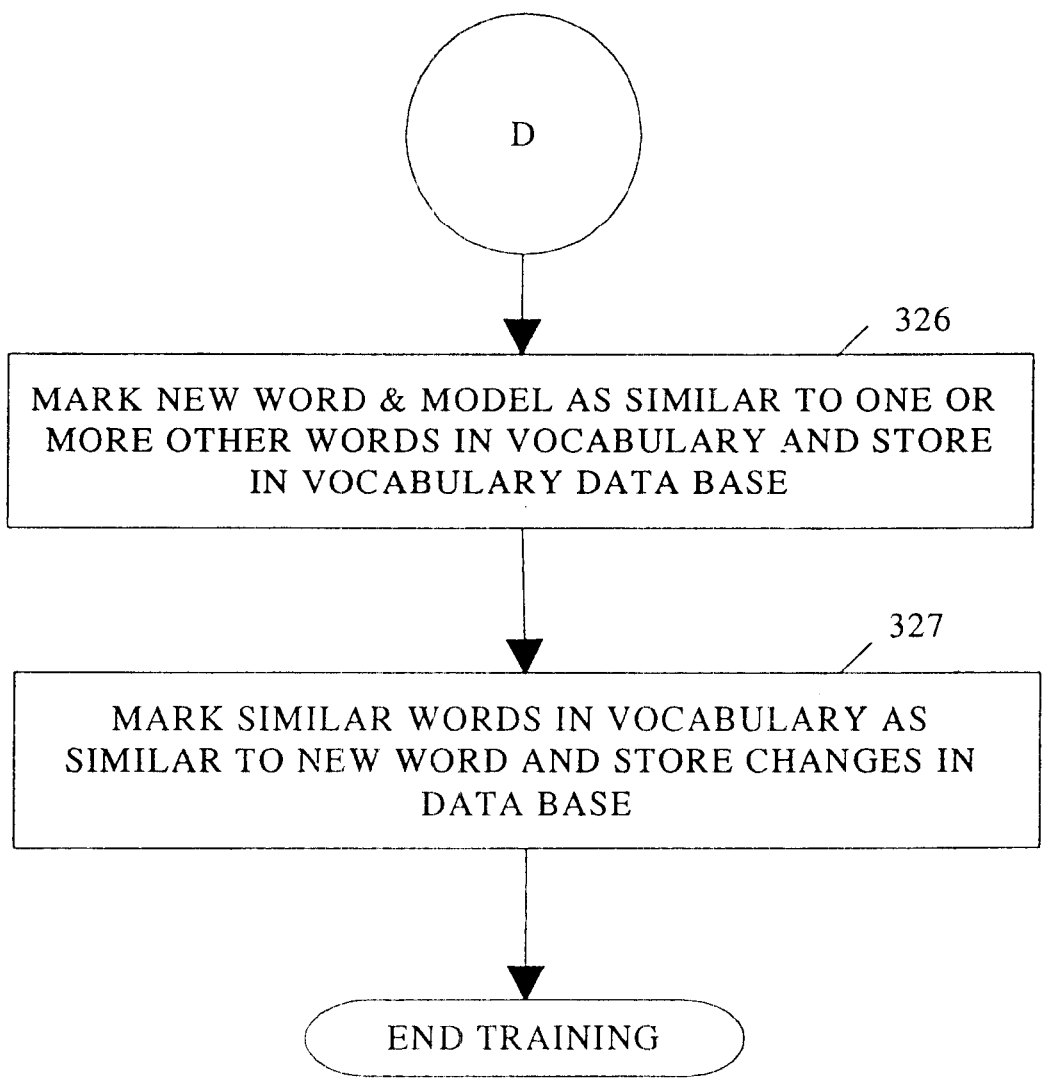

The recognition process consists of speech detection, feature extraction, computation of score and the determination of the word ID. This sequence of operations can be carried out on a frame-by-frame basis or on the entire utterance. In the frame-by-frame approach, speech detection is followed by the feature extraction and the computation of score for each frame. At each frame, the distance and the accumulated score for each model are computed as follows:

$$\text{distance} = \frac{-1}{2}\sum_{k=0}^{K}[c(k) - \overline{c}_j(k)]^2$$

$$\text{score}_j(t) = \text{Max}\{(\text{score}_{j-1}(t-1) + \log a_{j-1,j}), (\text{score}_j(t-1) + \log a_{j,j})\} + \text{distance}$$

for j=1, 2, . . . N and t=1, 2, . . . number of input frames where 't' is the current frame number, 'j' is the state, 'K' is the length of feature vector, c(k) is the feature vector for each frame of the input word being compared and $\overline{c}_j(k)$ is the 'k'th element of the mean vector for state 'j' and $a_{i,j}$ is the transition probability from state 'i' to state 'j'. The above computation of scores is repeated for each state in each vocabulary word model and the scores for each state accumulated. By the time the end of the speech is detected, the final score (maximum of N accumulated scores at the last frame) for each vocabulary word is available and these scores are used to determine the word ID. Since at each frame, the score is computed for all of the models, all the vocabulary word models are retained in memory until the end of the word is detected. The details of the With reference to FIG. 5, The commencement of speech recognition, step 200, commences with the sampling of the speech signal in the form of a frame segment as was done in the training stage, step 201. The energy feature vector is computed, step 202. The variable Begin_Found is evaluated to determine if the beginning of speech has been previously detected, step 203. The computed energy is then evaluated to determine if the energy threshold is sufficient to indicate speech is present, i.e. above noise, step 204. If the energy does exceed a given threshold, step 204, then the Begin_Found flag is set, step 205 and the system computes the distance for each model using the models, step 209 for each state, step 206. The accumulated score is then computed for each model, step 207. The next frame is selected and processed in a similar manner, step 208. If, the Begin_

Found variable is determined to be 1, step 203, the energy threshold is tested to determine if the energy is less than the threshold, step 210. If it is not then speech is still being detected, and the next frame is again selected, step 208. This process is repeated until the energy drops below the threshold, step 210. This signals the end of speech and the End_Found flag is set to 1, step 211. The system then computes the distance for each model and each then current state, step 212 and the accumulated score is then computed for each model and the input speech, step 213. It is possible that the low threshold is due to a pause in the speech and that the detected low energy is not the end In typical systems the system continues to check if the end has actually been reached and check the energy values for a change, step 214 This can continue for 10 to 20 more frames. During that period the system assumes the end is not found, the distances are computed and the accumulated score, step 206, 207. When the post processing limit is reached and energy level has remained below the threshold, the end is determined to be found, step 214. The scores are then arranged in a descending order, step 215. A confidence measure is computed based on the top L scores, step 216. A confidence measure threshold is evaluated, step 217. In the example case 75% of the best score is used as the threshold value. If the confidence measure is low, i.e. below the threshold, the utterance is rejected, step 220 and the user is provided a prompt so indicating, step 221. If the confidence measure is high, the word is recognized, step 218, and the I.D. determined, step 219. Once an utterance is recognized, it may be used to transmit the word to other receiving systems, it may be used as a command for telephone dialing or for voice to text applications and a host of other types of applications where word recognition is required.

As noted above, once the scores for all the models are available, the scores are sorted in descending value. Then a confidence measure is computed based on the top 'L' scores (where L is the position in the list of the scores and is an arbitrary limit, e.g. 2–4 top scores). Using the confidence measure (CM), as defined below, a determination is made as to whether the utterance should be rejected or if it can be matched with one of the stored vocabulary words. In the later case, the word ID for the utterance being evaluated is declared as the ID of the stored vocabulary word that best matches the utterance.

During the recognition phase, the current system computes a confidence measure that indicates the confidence level of current decision of best matched word. In particular, when a spoken utterance (to be recognized) is compared with all the existing models in the vocabulary database, the scores for all the word models are arranged in a descending order with the best (highest) score being at the top of the list. A simplified confidence measure is defined as:

$$cm = \frac{1}{S_1}\left(S_1 - \frac{1}{(L-1)}\sum_{i=2}^{L} S_i\right)$$

where $S_1$ is the highest or best score and $S_2 \ldots S_K$ are the next L >I best scores. Then, all the spoken utterances with cm <x % are rejected where x is a user-defined number. The preferred implementation includes the case of L=2.

This CM is will be highest when the top scoring word is acoustically dissimilar to the following words in the list and the lowest when the top scoring word is acoustically similar to the second best or third best word on the list. Based on this criterion, the preferred implementation is built to detect the acoustically similar sounding words.

Hence, every time the user desires to enter a new word to the vocabulary, this is indicated to the system and the system prompts the user for the new utterance. A model is built using the new utterance. Then, a recognition task is performed on the new utterance and the resulting scores are ordered in descending order. Using the sorted list of scores, a confidence measure may be computed, for example, as follows:

If (best_score—second_best_score)<75% of best_score then

Reject the utterance and ask the user to choose another word else

Add the word to the vocabulary list

In this case, if the confidence measure is lower than the predetermined threshold, the user is warned that the new utterance to be added to the vocabulary list is too close to the word corresponding to the second best score. The user is asked to select another word for better performance. Alternatives can also be suggested by the system. For example: where the system is implemented in a telephone system, in the case of a "Voice-Dialing by Name" application, when a new name is declared to be close to an existing name in the vocabulary, the system may suggest the user to change the new entry by adding a last name or middle name. If the user still insists on adding the same word, the word can be added to the vocabulary after marking the new word and the vocabulary word found close to the new word as acoustically similar.

FIG. 6 illustrates the training for a single word. When the user initiates single word training, step 300, the system samples a frame of the processed speech signal, step 301. The energy of the feature vector is determined, step 302. The system determines if the Beginning of speech has been previously found by testing the Begin_Found variable, step 303. If the Begin_Found variable is equal to 1, the energy vector is tested against a threshold, e.g. above ambient noise, step 304, If the energy is not greater than the threshold, step 304 then the system assumes that speech is not present, and selects the next frame, step 307 and the process commences again. If the energy is greater than the threshold, the system sets the Begin_Found variable. The feature vector is saved in storage, step 306, and the next frame is selected, step 307. If the Begin_Found variable has been set previously, step 303, the energy is again examined, step 308. If the energy exceeds the threshold, the system presumes that speech is still being processed and the feature vector is stored in storage, step 306. If the energy is less than the threshold, the system knows it has reached the end of the speech and sets the End_Found variable to 1, step 309. Again, it should be noted that Typical systems continue to check for END for 10 to 20 frames or so to ensure that the end of speech has been encountered and that the silence is not just a pause in speech. The final feature vector is saved in storage, step 310. The sequence of feature vectors is partitioned into segments, step 3 11. The mean vector and transition probabilities for each state are estimated, step 312 and the Model parameters are saved, step 313. The distance is computed for each model and each state, step 314, and the scores accumulated, step 315. The scores are sorted in a descending order, step 316 and a confidence measure calculated between the close scores, step 317.

The system compares the confidence measure with a threshold, step 318, determined based on the particular application which will render acceptable results. If the Confidence Measure is high then the word being entered is not confusingly similar to the nearest models and the new model for the word is stored, step 324 and the user is advised of the acceptability of the word, step 325. If the Confidence Measure is low, step 318, then there is a confusingly similar word in the vocabulary and the user is advised, step 319. The system then prompts the user for another word, step 320. If the user selects another word, step 321, then the new word is received, step 322 and the process begins anew, at step 300. If the user does not wish to enter another word, step 321, the new word model is marked as confusingly similar to existing models, step 326 and the existing models are marked as confusingly similar to the new word model, step 327 and training ends.

The following modified scoring algorithm can be applied to resolve confusion during the recognition phase.

When the vocabulary consists of two vocabulary items (Jim, Tim) that are acoustically very similar to each other, those words are marked as confusable during the smart training phase otherwise these models may cause errors during the recognition phase. For example, when the test utterance is 'Jim', the score for the model 'Jim' (correct model) may be very close to (but slightly smaller than) the score for the mode 'Tim'. In that case, the word is declared as 'Tim', an incorrect recognition with a correspondingly low Confidence Measure.

Model Score
 Tim 446.7
 Jim 445.1
 Office 350.5
 Home 300.5 . . .

In the case where a test utterance corresponding to one of these words is recognized correctly, the confidence level will still be very low.

Model Score
 Jim 446.7
 Tim 445.1→CM~1%
 Office 350.5
 Home 300.5 . . .

To resolve issues with respect to confusingly similar words, the scoring algorithm is modified so that the acoustically similar portions of the words get less weighting than the other portions. Thus, during the training phase, when a new confusable item is added by the user (in spite the warning regarding acoustically similar words), it is marked along with the model in the existing vocabulary that is close to the new item. For example, if a user has the following vocabulary items in his list.

1. Mom
2. Tim
3. David
4. Office
5. Home
6. Pat
7. Linda;

and the user tries to add 'Mat' to his list. The smart training system will indicate to the user that the word 'Mat' is close to one of the existing vocabulary items 'Pat' and prompts the user for another word. If the user declines the request, the word 'Mat' will be added to the vocabulary by marking both 'Pat' and 'Mat' as confusing items.

1. Mom
2. Tim
3. David
4. Office
5. Home
6. Pat→close to item 8
7. Linda
8. Mat→close to item 6

While HMM may be used to evaluate speech on a fixed segment basis, an optimized segmentation evaluation may is used during recognition. As shown in FIG. 7A, the utterance for 'Mat' can be aligned with both the marked model and the new model (that is, the models for "Pat" and "Mat", respectively) using Viterbi Alignment/Scoring which segregates optimized segments of speech into non-fixed segments. Once the alignment is done, the accumulated score at the end of each state is compared for each of the models. Referring to FIG. 7B, if $S_{m1}, S_{m2}, \ldots S_{mN}$ represent the accumulated scores at the end of each state for the model "Mat" and $S_{p1}, S_{p2}, \ldots S_{pN}$ represent the corresponding values for the word "Pat", then a state-level Confidence Measure (CM) is computed as:

$$CM \text{ for state } i = \frac{|(S_{mi} - S_{pi})|}{\text{Min}(S_{mi}, S_{pi})} \quad \text{for} \quad i = 1, \ldots N$$

In the example of FIG. 7B, N=5 the segments with low confidence level represent same acoustic part in both words. Hence, the segments (states) with high confidence level are marked as 'high CM' states and those with low confidence level are marked are marked as 'low CM' states. A weight is $w_l$ is given to each state. $w_l$ will be higher for high CM states and is lower for low CM states.

The low confidence states or segments correspond to the similar acoustic units in both words. Hence the distinguishing power of these segments/states is lower than that of the high confidence segments which represent the acoustically dissimilar units in both words. Hence the distinguishing ability of the scores can be increased by weighing the low confidence parts lower than the high confidence parts computing the total score. In a normal recognition system, the score is accumulated till the end of the speech. The final score at the end of the speech determines the word ID. In the modified/smart scoring the score is accumulated for each state and the final score is obtained as the weighted average of state level scores. The weights are assigned to each state based on the number of states in the model. In the current implementation, for an N-state model, if there are $N_h$ high confidence level states and $N_l$ low confidence level states, then the weights are assigned as follows:

$$N = N_h + N_l$$

For N<=5

$$w_i = \frac{1}{2*N_h} \quad \text{for} \quad i = 1, 2, \ldots N_h$$

$$w_j = \frac{1}{2*N_l} \quad \text{for} \quad i = 1, 2, \ldots N_l$$

For 5>N<=10

$$w_i = \frac{1}{3*N_h} \quad \text{for} \quad i = 1, 2, \ldots N_h$$

$$w_j = \frac{2}{3*N_l} \quad \text{for} \quad i = 1, 2, \ldots N_l$$

For N>10

$$w_i = \frac{1}{4*N_h} \quad \text{for} \quad i = 1, 2, \ldots N_h$$

$$w_j = \frac{3}{4*N_l} \quad \text{for} \quad i = 1, 2, \ldots N_l$$

While in the current implementation, N is limited to a maximum of 15, any number of states could be used dependent on the processing speed of the processor and memory.

With regard to the above, short words, those with states which are less than or equal to five are weighted 50/50 between similar and dissimilar states. Intermediate words, i.e. those with states greater than 5 but less than or equal to 10 are weighted ⅔ for similar states and ⅓ for dissimilar states. Long words, i.e. those with states greater than 10, are weighted ¾ for similar states and ¼ for dissimilar states. The weighting applied may vary with respect to the computing and memory capacity of the system and other weightings may be devised which optimize the particular system used.

During the recognition phase, this information is used to distinguish between the acoustically similar words. For example, when the user says one of these two words (either "Pat" or "Mat"), the scoring is performed in two passes. The first pass results in the scores for all models. Assuming that the test utterance is "Pat", the scores from the first pass of recognition may be appear as follows:

Model Score
  Mat 1023
  Pat 1018
  Mom 980
  David 950
  Office 890
  Tim 800
  Home 760
  Linda 710

Since the confidence level is very low, the word spoken could be either the first choice or the second choice. In order to make the correct decision, the second pass of the scoring is performed using only the top two candidates in this example (those closest in score) from the score list and the scores for these words are computed as:

Final score for model "Mat" computed as:

$$\sum_{i=1}^{N} w_i S_{mi}$$

and the score for "Pat" is computed as:

$$\sum_{i=1}^{N} w_i S_{pi}$$

where $w_i$ is the weight for state 'i'. Since those portions of the models corresponding to the distinct sounds are given higher weights, the correct word would score higher and hence will result in correct recognition. In the above example, the second pass of scoring may result in:

Model Score
  Pat 985
  Mat 975

Hence, along with the smart training, the smart/modified scoring based on different weighting of similar and dissimilar segments will correct many of the recognition errors that would have remained as errors in the absence of modified scoring. Thus, the current invention provides improved system performance at two stages: (1) During the initial training by warning the user of similar sounding words and there by preventing entry of confusingly similar words into the vocabulary and (2) in case of such words being entered into the vocabulary (despite the warning), the two-pass scoring will eliminate the errors during the recognition phase.

The logic and the algorithms described above for two similar words can be easily extended to multiple acoustically similar words. For example, the same procedure can be extended when the vocabulary consists of the following words and the user wishes to add the name "Lim" to the vocabulary word.

1. Mom
  2. Tim→close to items 9 & 10 (50/50)
  3. David
  4. Office
  5. Home
  6. Pat→close to item 8 (50/50)
  7. Linda
  8. Mat→close to item 6
  9. Kim→close to items 2 & 10 (50/50)
  10. Jim→close to items 2 & 9 (50/50)

The above procedures for smart training and smart scoring can be applied when the user tries to add the new word "Lim".

In addition to the detection of confusingly similar words, the smart training also prevents some of the situations during the training which may result in inaccuracies in recognition. Two such situations are: 1. Including very short duration words in the vocabulary. 2. Including multiple-word items with long silence in between words in the vocabulary. Our SD recognition system consists of a simple energy-based speech/silence detection module. This module can modified to find the duration of the speech portion of the utterance. Once the speech portion of the utterance is measured from end-to-end, a duration threshold is applied so that the user can be alerted about the possible recognition errors when he/she enters very short words. Alternatives such as including the last name or repeating the same word in another form ('James' instead of 'Jim') are suggested by the system. Another problem encountered during the training is due to multiple-word items. When a user desires to include 'Jim Johnston' or 'Ann Marie Parker', the consistency of pronunciation is crucial to the success of 1-token training SD systems. Hence, it is important to capture a typical pronunciation during the training as opposed to an unusual pronunciation. If for any reason, the user utters the above entries with long pause in between words, the user may not utter the items in exactly the same way during recognition. In such cases, the smart training algorithm detects the multiple-word entries during the training and measures the silence periods in between words. If the silence duration exceeds a certain threshold, the user is warned about the unusual pronunciation and is asked to repeat the utterance. Despite the warning, if the user wishes not to repeat the utterance, then the utterance is modified (by truncating the silence portion) before a model is built. These two features of smart training system improve the recognition performance considerably.

The preferred overall smart training system that incorporates all the above features is depicted in FIGS. 8A–8H.

In FIGS. 8A–8H, the system receives the speech, step 500. A frame segment is analyzed, step 501 and the energy and feature vector is derived, step 502. If the Begin_Found variable has not been set to 1, step 503, the system evaluates the energy vector, step 504. If the energy is not above the energy threshold, step 504, then the system determines that the start of speech has not been found selects the next frame, step 507 and the process begins again. If the energy threshold is exceeded, step 504, then the system determines that the beginning of speech has been found and sets the Begin_Found variable to 1, step 505. The feature vector is saved in storage, step 506. The next frame is selected, step 507 and again sampled, step 501. If the Begin_Found variable has been set to 1, step 503, then the energy computed at step 502, is compared to the threshold. If the energy is above the threshold, step 508 then the system assumes that speech is still being processed and saves the feature vector, step 506 and the next frame is selected, step 509 and again sampled, step 501. If the energy falls below the threshold, step 508 and the end is not found, step 509 silence is accumulated, step 511 and 514, the feature vector is saved, step 506 and the process continues. if the period of silence which is associated with the end of speech, e.g. 10–20 frames is found, step 509 the system knows it has reached the end of speech. The system sets the End-Found Variable to 1, step 510. The system then computes the duration of speech step 515, FIG. 8D. If the duration of speech is less than a single syllable, step 516 the user is prompted that the word is to short, step 529 and requests the user to enter another word, step 537, FIG. 8G. If the user wishes to enter another word or phrase, step 538, the system requests the entry of the word, step 539 and process begins anew at step 500. If the user does not wish to enter another word, step 538, then the system partitions the feature vectors into segments, step 525, estimates the mean vector and transition probabilities for each state, step 526, computes the distance for each model, step 532, and each state, step 527, computes the accumulated score, step 528, arranges the scores in a descending order, step 529 computes a confidence measure between training word and vocabulary words, step 530. The confidence measure is compared with the threshold, step 531. If the confidence is high, the system partitions the sequence of feature vectors into segments, step 512, estimates the mean vector and transition probabilities for each state, step 513 and saves the input model, step 514 and training ends, FIG. 8C.

Figure 8A:
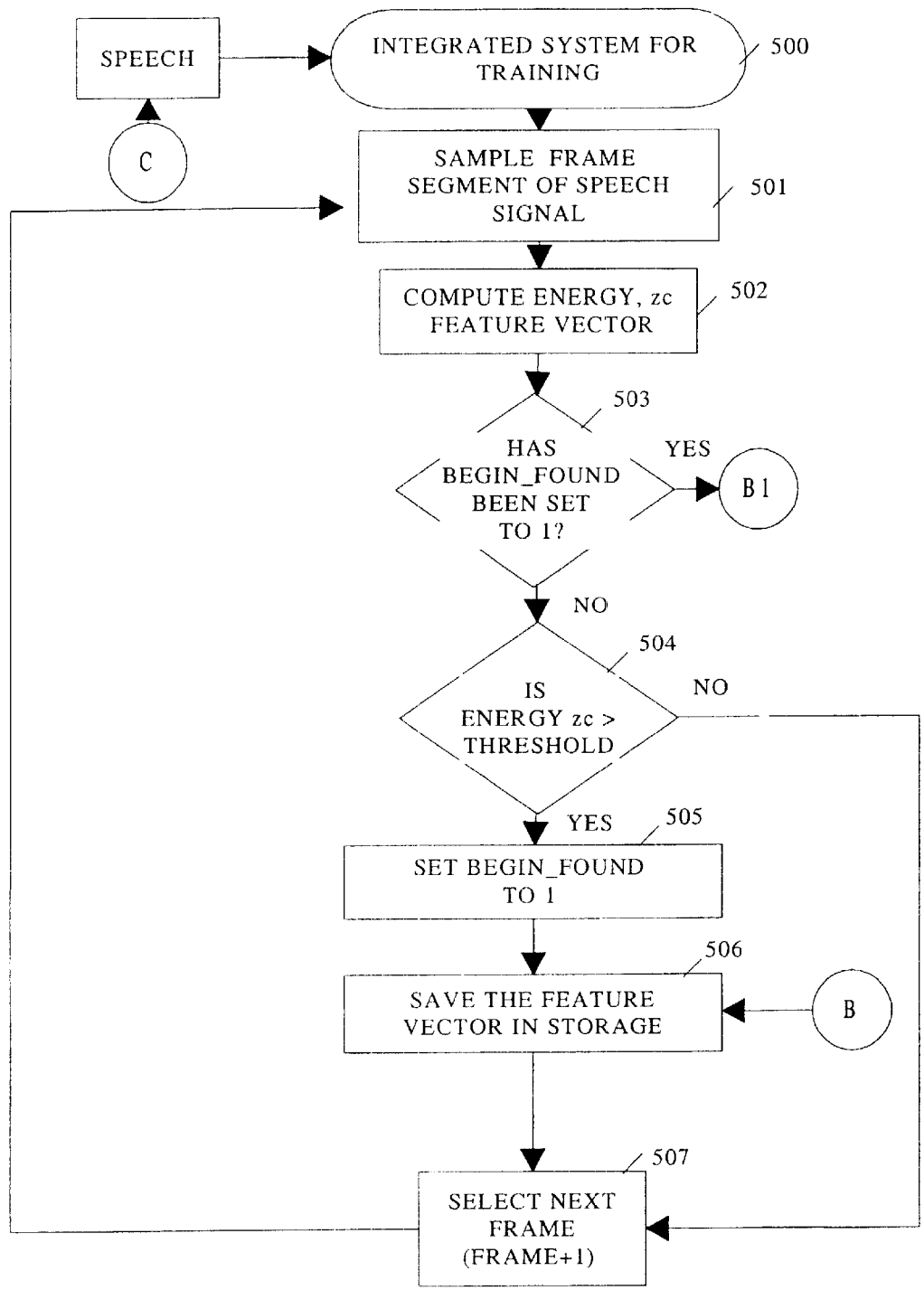
FIG. 8A–8H is an overall smart training system flow chart
Figure 8B:
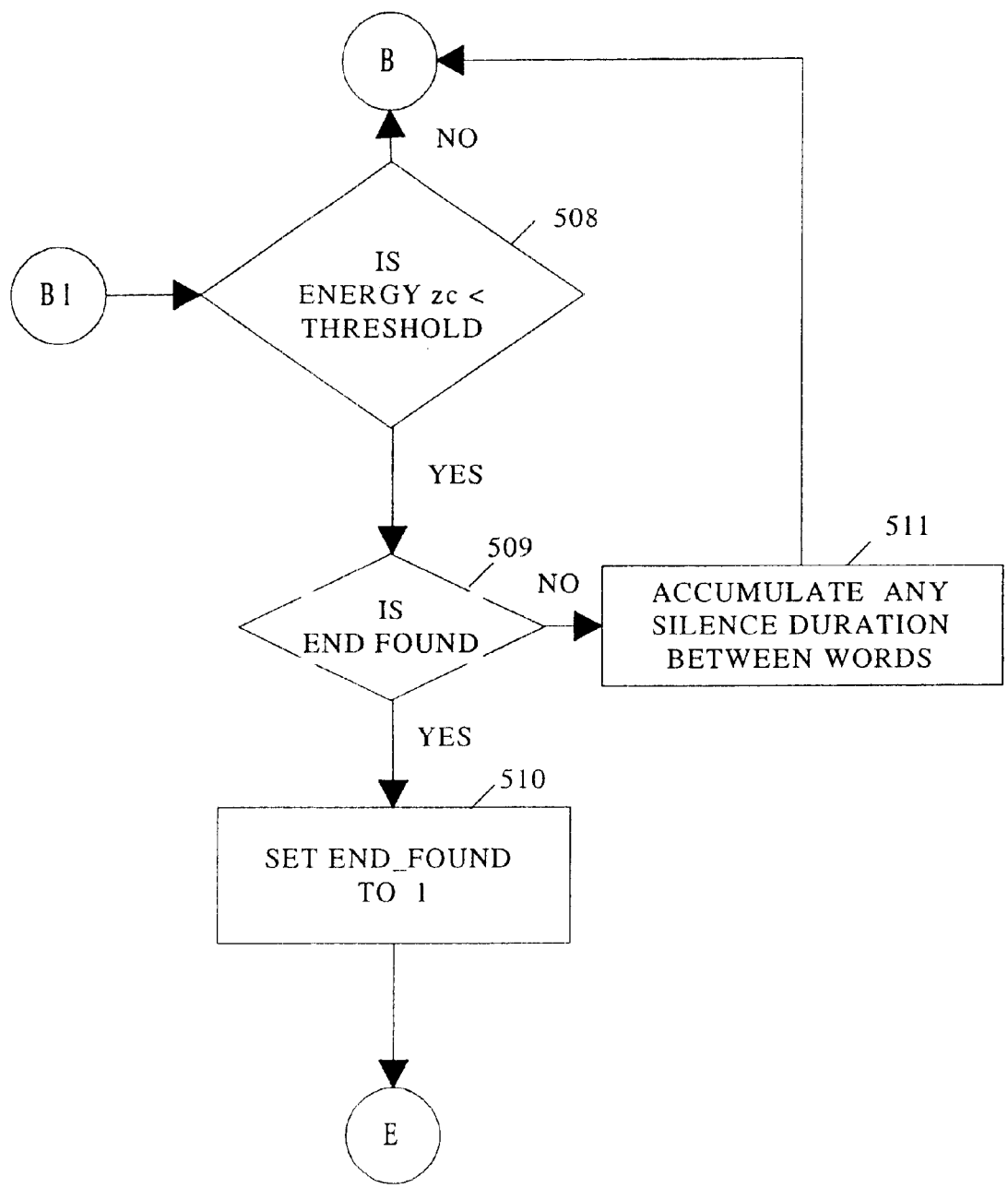
Figure 8C:
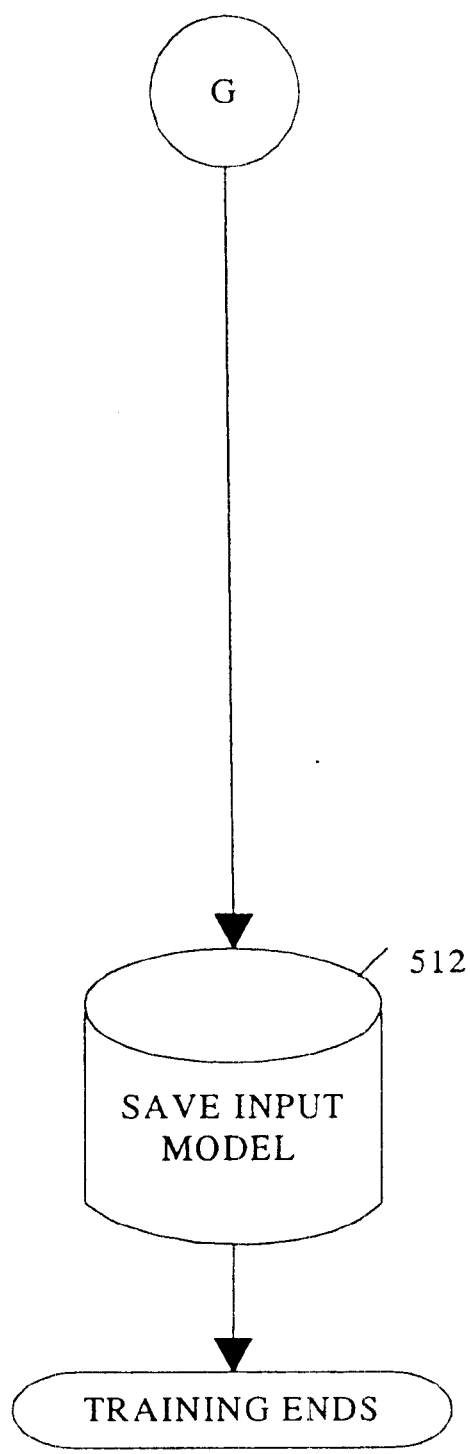

Referring to FIG. 8B, if the End is not found, step 509 then the duration of silence is accumulated for each period of silence, step 511 and the feature vector is saved, step 506, and the process continues.

Figure 8D:
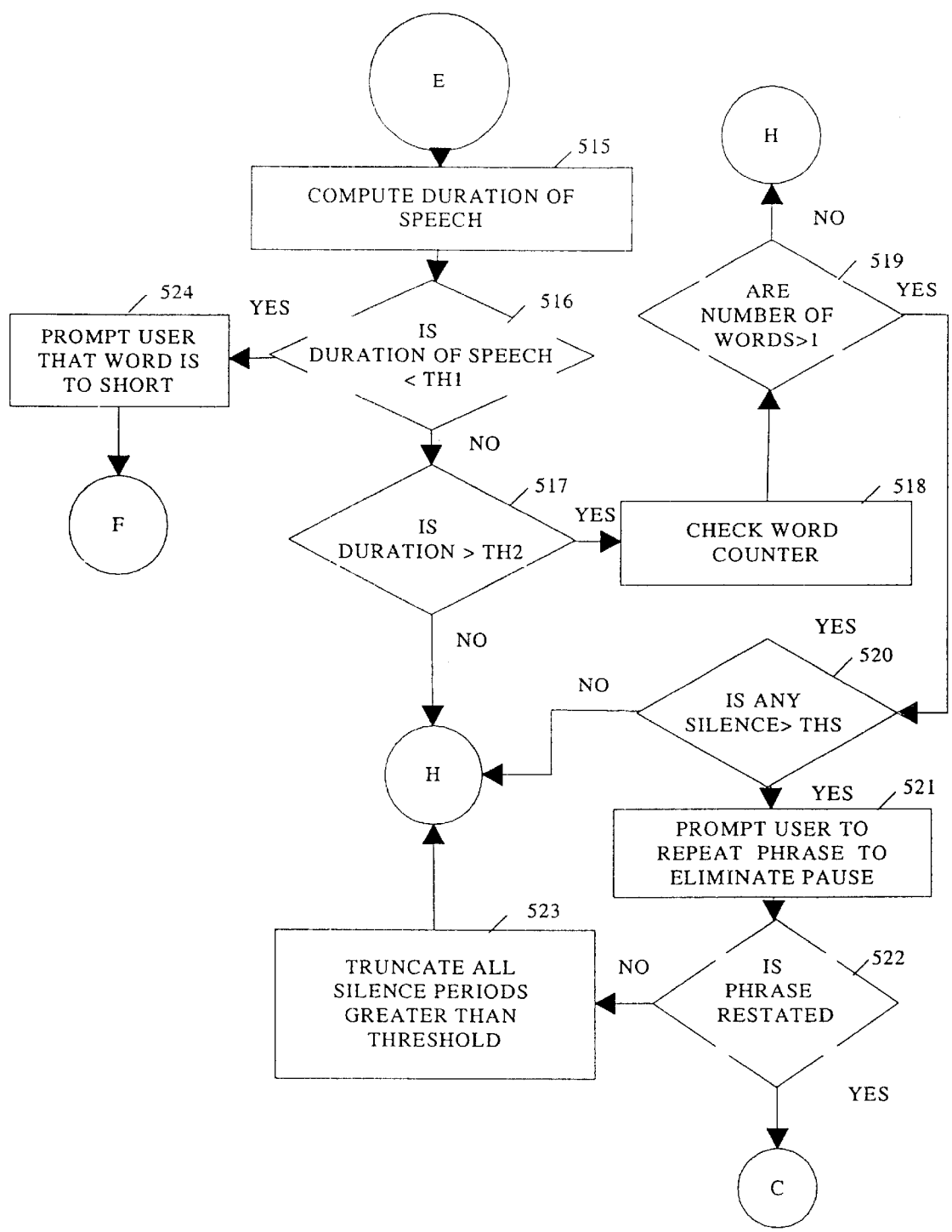
Figure 8E:
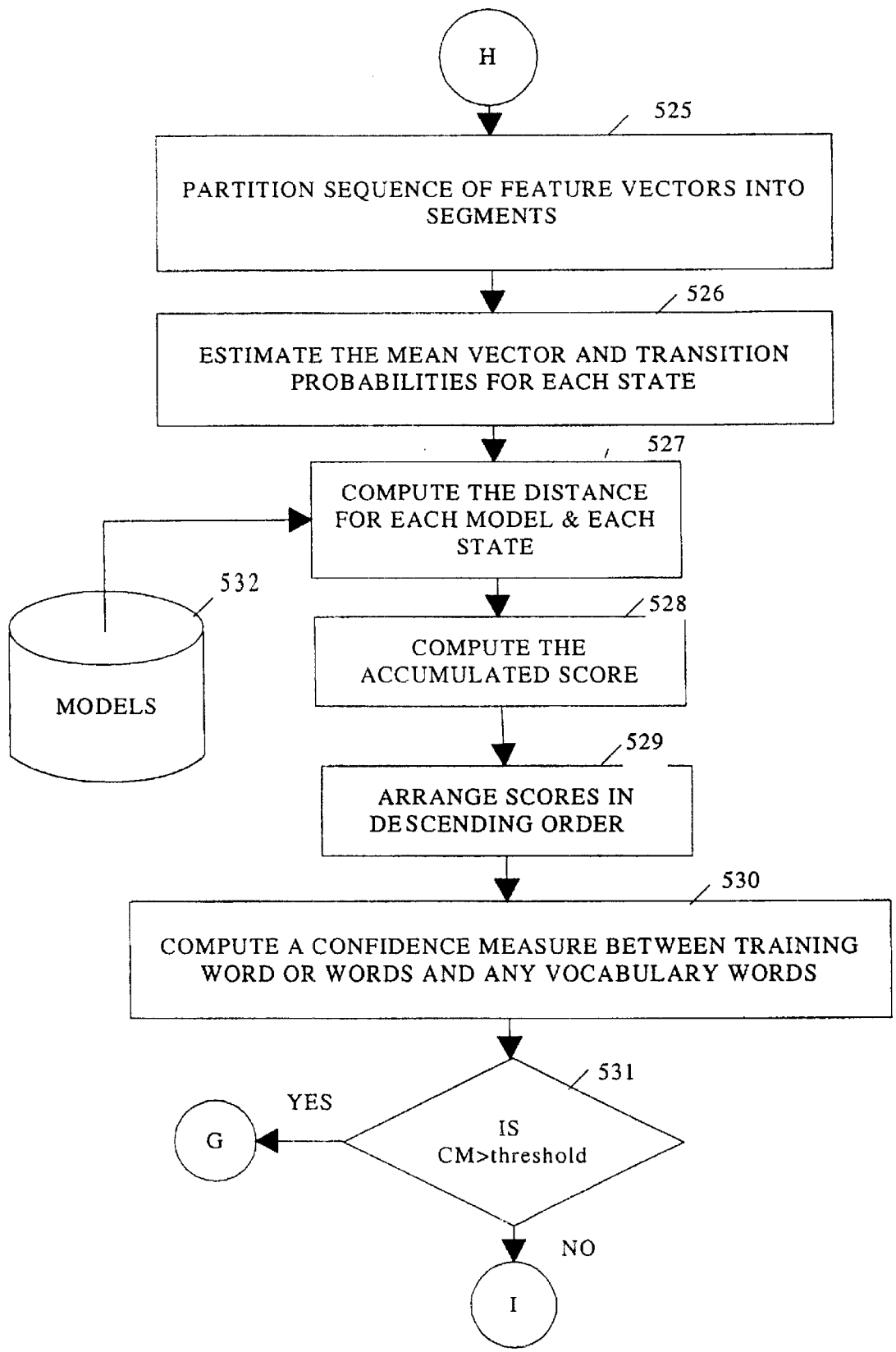

Referring to FIG. 8D, if the duration of speech exceeds the threshold TH2, (e.g. 3 seconds) step 517. Then the system checks the word counter, step 518. A word counter is implemented which determines the number of words with periods of silence in between. Since silence is accumulated the duration of in-between word silence can be computed based on frame position and thereby determine the number of words. If it is determined that the word is simply a long single word, step 519 then as shown in FIG. 8E the system partitions sequence of feature vectors into segments, step 525, estimates the mean vectors and probabilities, step 526, computes the distance for each model and each state, step 527, computes the accumulated score, step 528, arranges scores in descending order, step 529, computes a confidence measure between training word or words and any vocabulary words, step 530. The confidence measure is compared to the threshold, step 531 and if the threshold is exceeded, model is saved, step 512, FIG. 8C.

Figure 10:
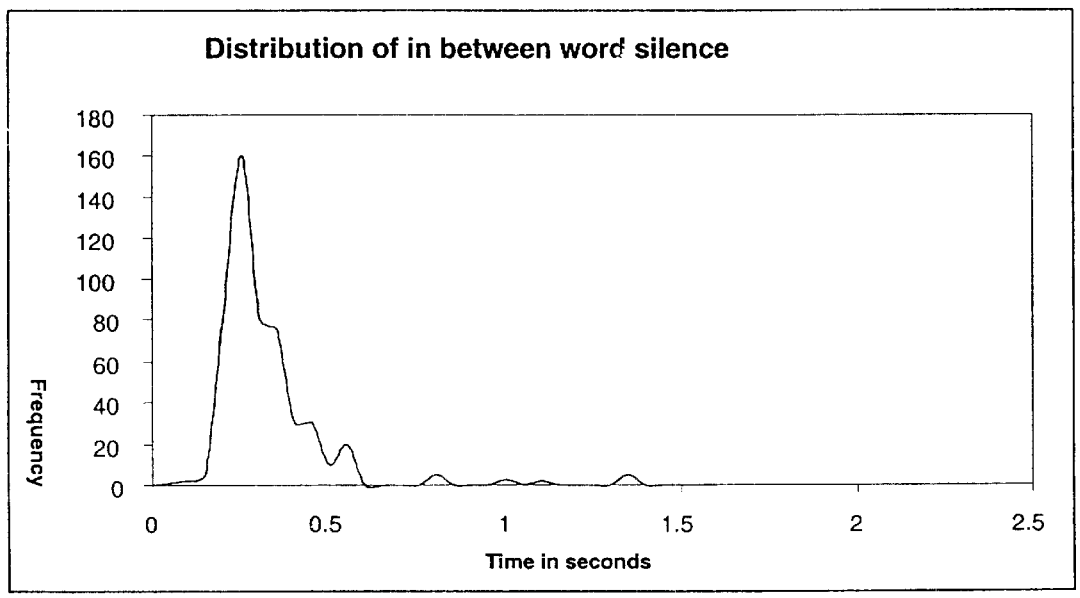
FIG. 10 is a graph of the distribution of in-between word silence
Figure 11A:
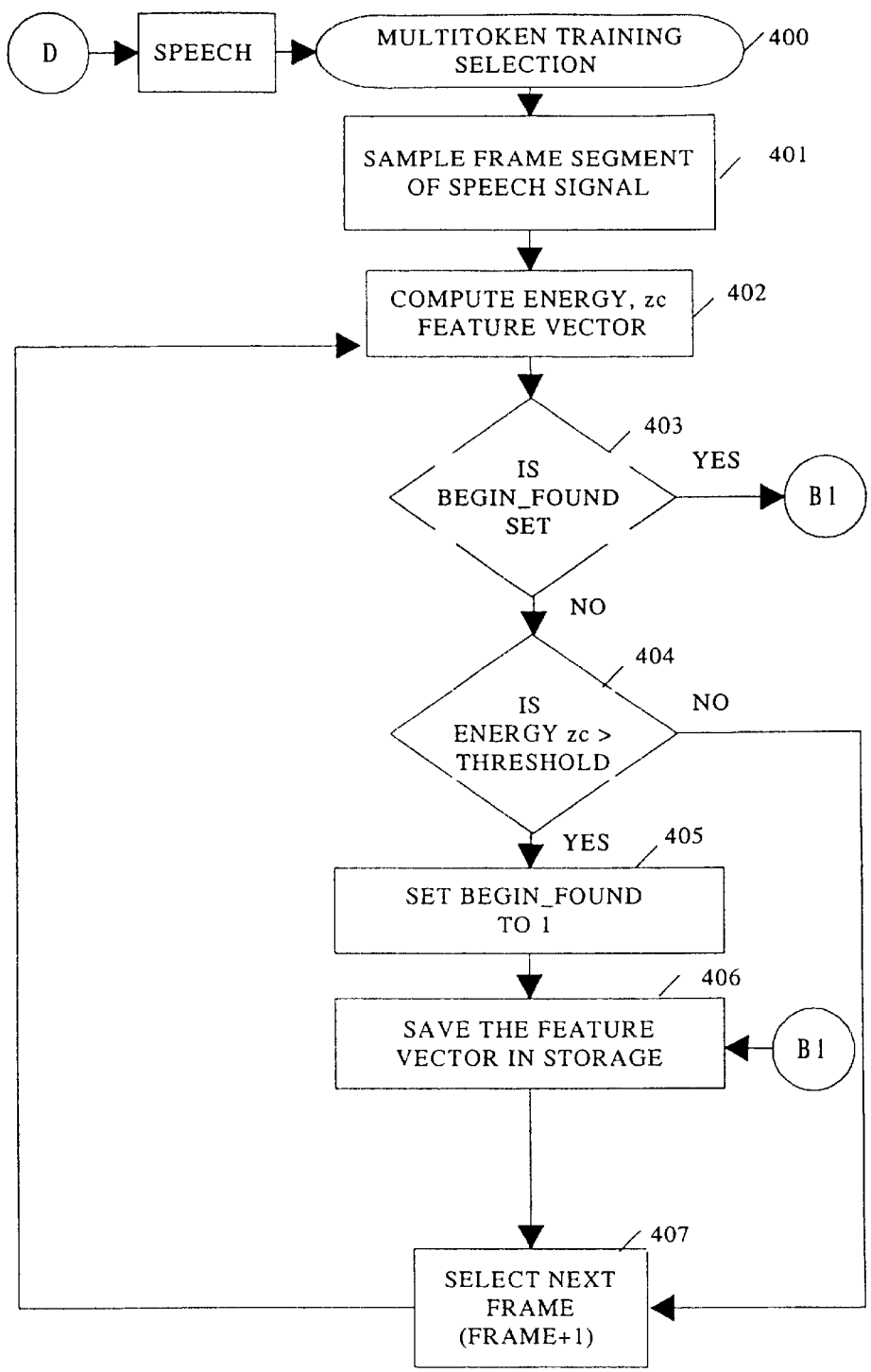
FIGS. 11A–11D is a smart training system flow chart for multiple token training
Figure 11B:
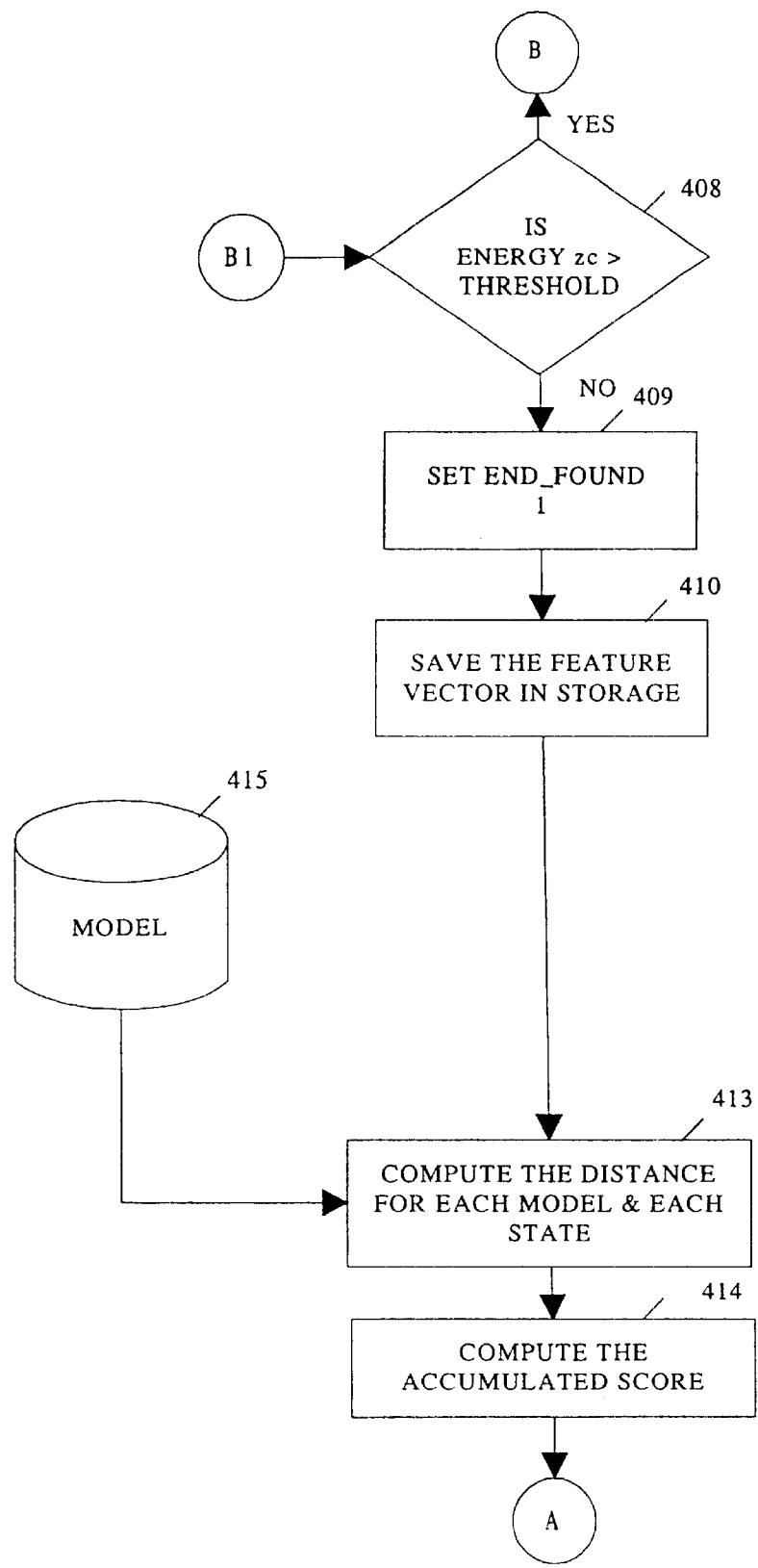
Figure 11C:
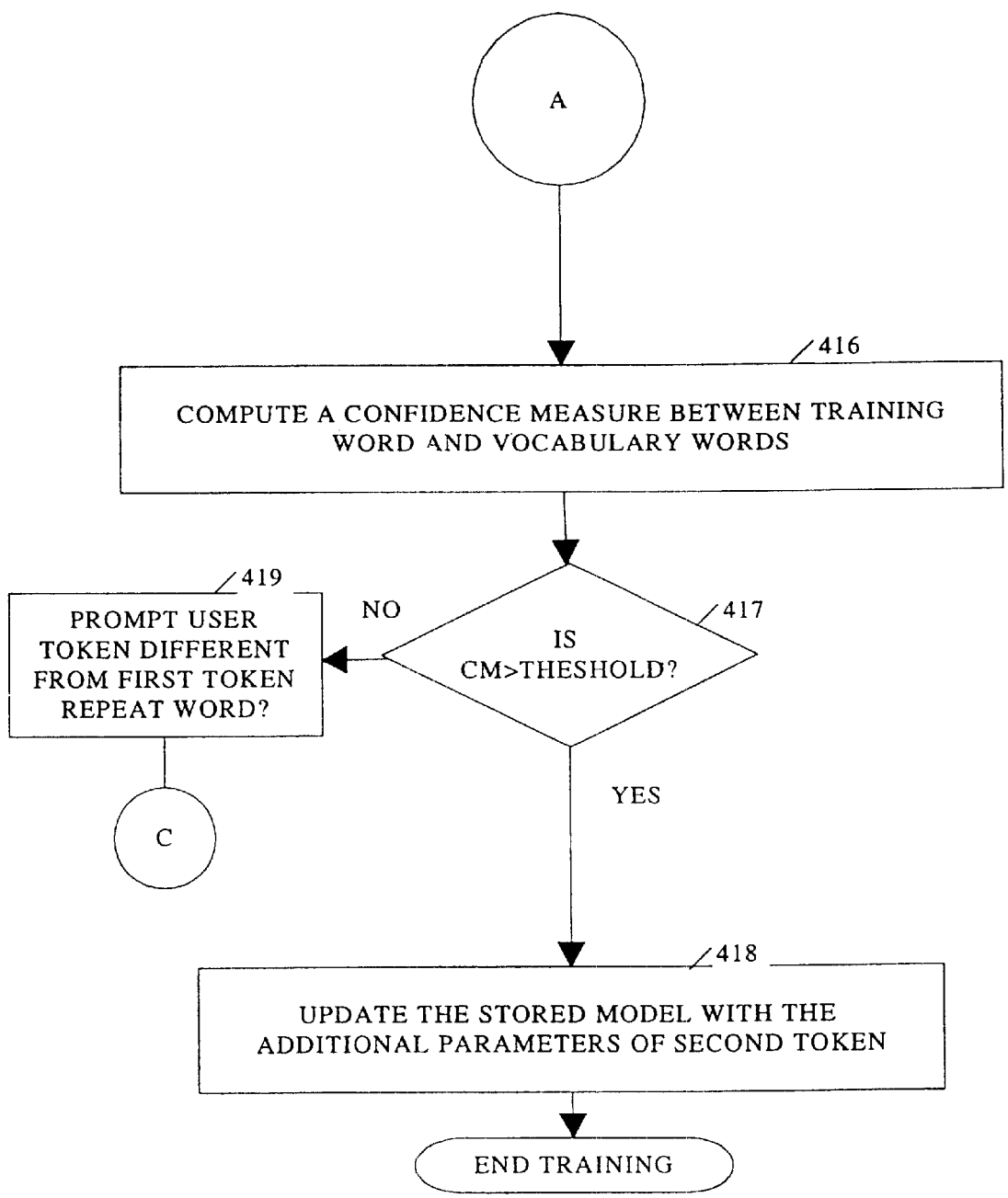
Figure 11D:
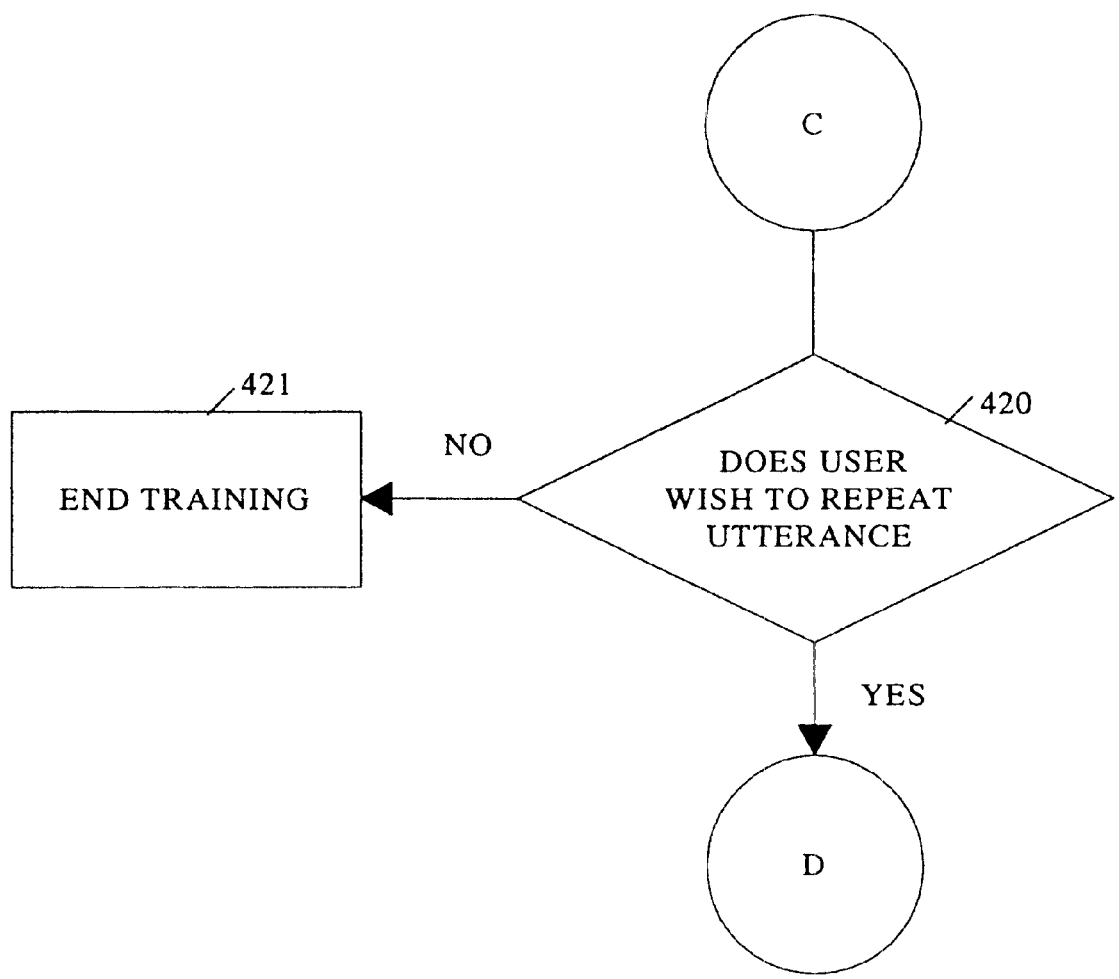

If the number of words is greater than one, step 519, then the silence periods are evaluated against a silence threshold, step 520. FIG. 10 shows a distribution graph of in-between word silence. Most of the in-between word silence falls below 0.6 seconds which is the threshold for this system. Other values may be more appropriate dependent on the speech environment. If no silence period exceeds the threshold, the distances for each model and each state are computed, step 525 and the model saved, if the confidence measure is exceeded, step 531 & 512 FIG. 8E & FIG. 8C. If the silence period exceeds the threshold, step 520, the user is prompted to repeat the phrase to eliminate the extended pause, step 521. If the phrase is restated, step 522, the process begins anew at step 500. If not, then each silence period which exceeds the threshold is truncated step 523 and the distances are computed, step 528, FIG. 8E, and if the confidence measure is exceeded then the word model is stored and training ends, FIGS. 8E and 8C.

Figure 8F:
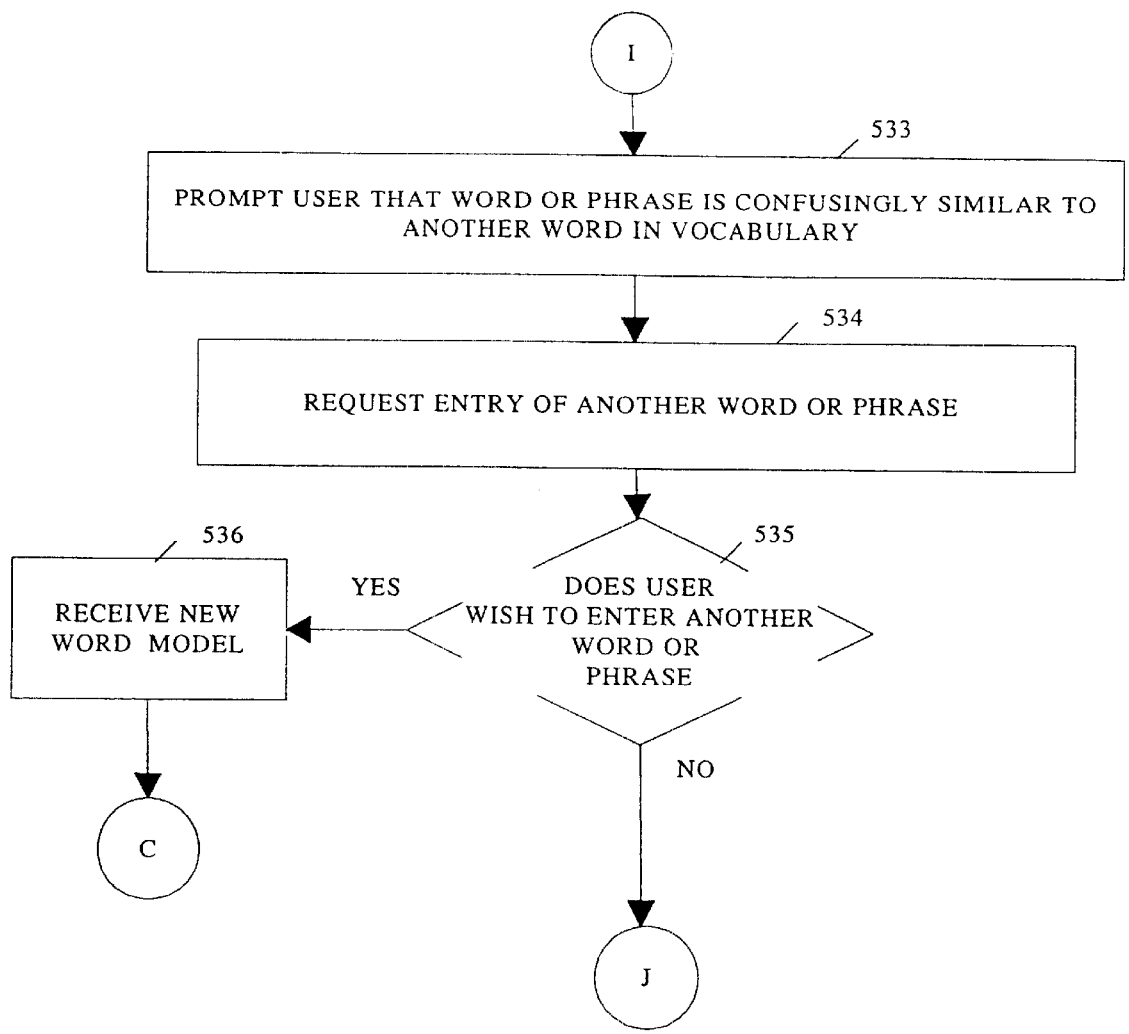
Figure 8G:
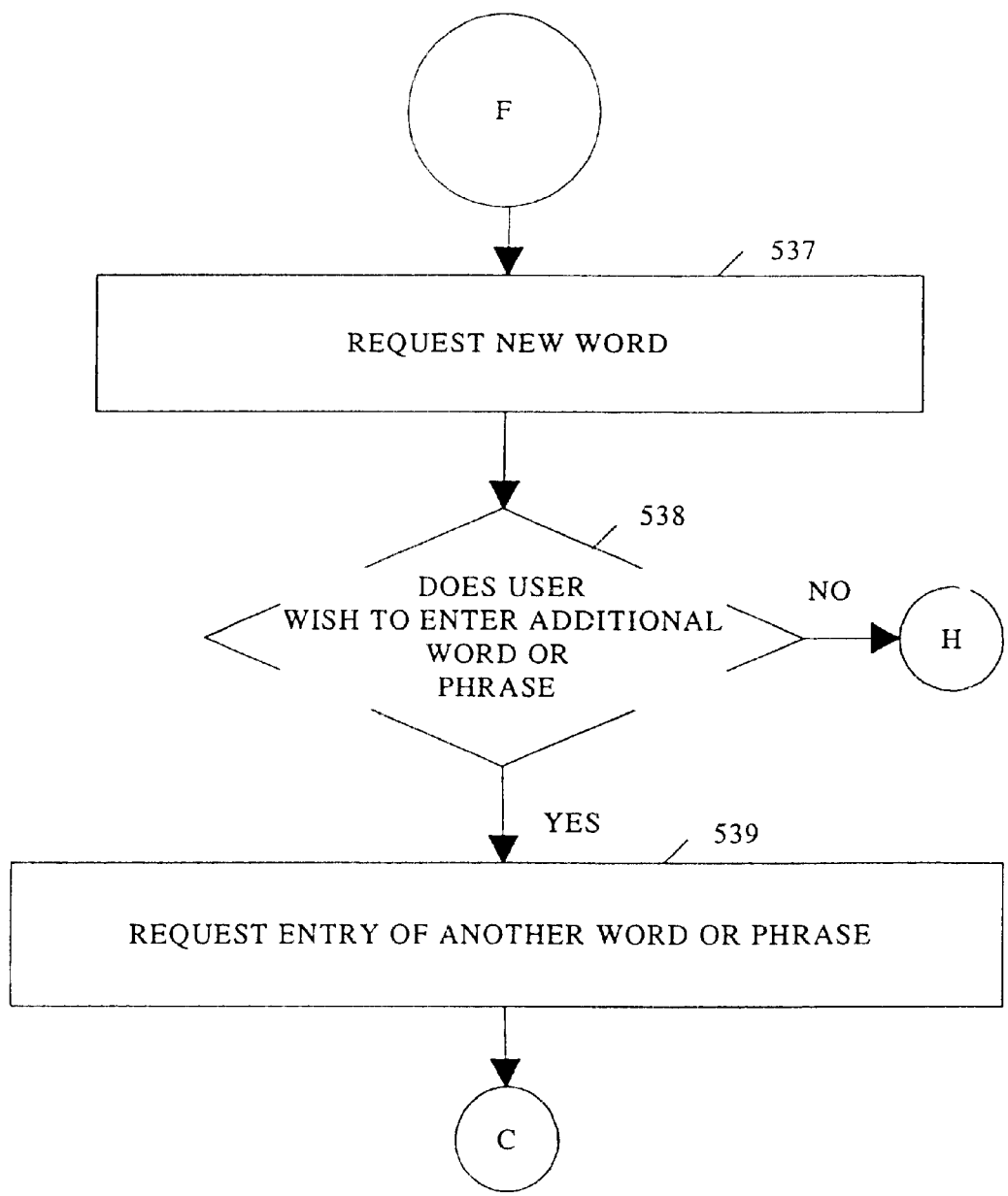
Figure 8H:
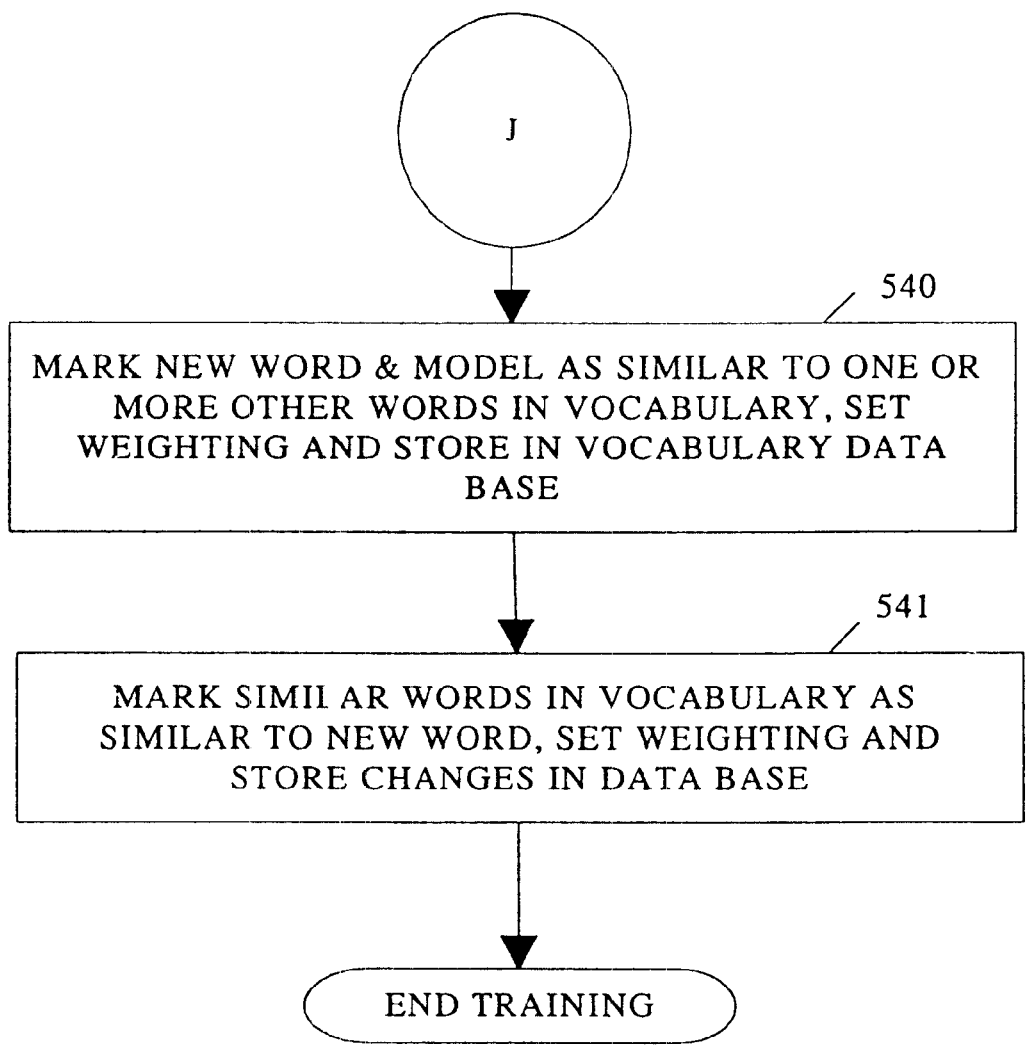

Referring to FIG. 8F, if the confidence measure between training words and vocabulary words is low, step 531, then the user is prompted that the word or phrase is confusingly similar to another word in vocabulary, step 533, FIG. 8F, and requested to enter another word or phrase, step 534. If the user does wish to enter another word or phrase, step 535, then the new word model is received, step 536 and the process begins anew at step 500. If the user does not wish to enter another word or phrase, step 535, then the system marks the new word and model as similar to one or more other words in vocabulary, and sets the weighting and stores the model in the data base, step 540. The vocabulary words are marked as similar to the new word, the weighting is set and the changes are stored in the data base models, step 541 and training ends.

Figure 9:
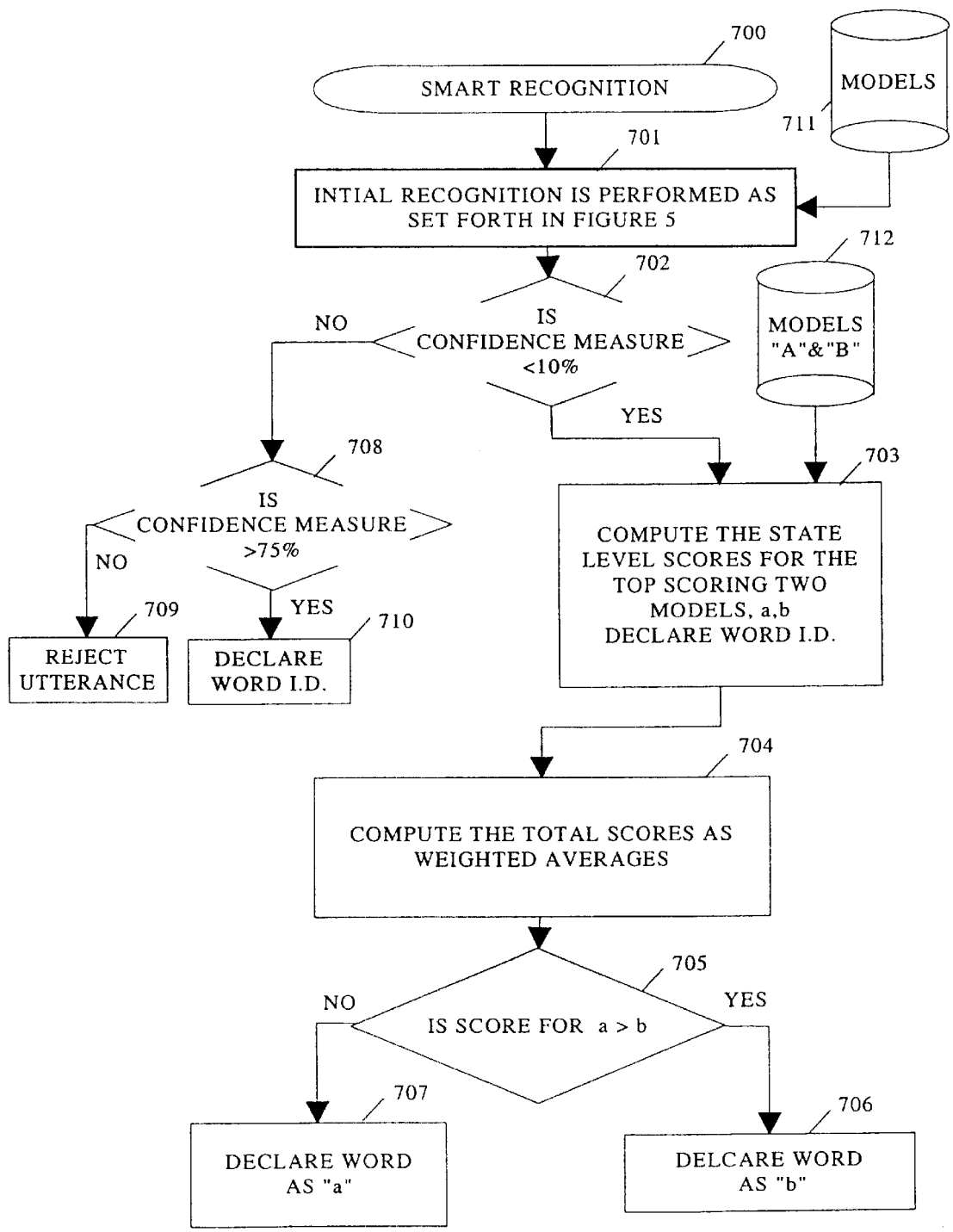
FIG. 9 is an overall recognition system flow chart

The recognition phase is illustrated in FIG. 9. Recognition commences, step 700 with the process set forth in FIG. 5, step 701 using models 711. An evaluation of the confidence measure is made, step 702. If the confidence measure is less than 10%, step 702, then the system computes the state level scores for the top scoring two models, a and b, step 703. The system computes the total scores as weighted averages. $S_T^a = w_1 S_1^a + \ldots + W_N S_N^a$ and $S_T^b = w_1 S_1^b + \ldots + w_N S_N^b$ step 704. The weighted scores are compared, step 705 and if the score for "b" exceeds the score for "a", step 706, then the word I.D. is declared as "b" otherwise the word I.D. is declared as "a" step 707.

If the confidence level is not less than 10% then the confidence level is tested to see if it exceeds 75%, step 708. If so, then the word I.D. is declared for the high confidence level word, step 710. If not the utterance is rejected, step 709.

Finally, it should be. noted that the smart training system as described herein can also be extended to multiple-token training where multiple repetitions of the same word are used to build a model. Even though the single-token training is a unique feature of the SD speech recognition system of the present invention, the system can also perform multiple-token training. The multiple token training can either be performed in one stage or in several stages over a period of time. In the single-stage training, all the tokens of a particular vocabulary item are available at the same time. The model is estimated using all the repetitions of the item.

In multi-stage training, a model is built in the manner described above when the first token is available. The model built from this single-token is updated as more repetitions of the same word/item are available. In either case, the consistency in pronunciation is crucial to the goodness of the model and hence the performance of the system. For example, if the user has entered "Jim Johnston" as the first token, at a later stage he/she may enter "James Johnston" or "Jimmy Johnston" as the second token (intentionally or unintentionally). In that case, the smart training program compares the new token (second or third repetition) with the model built from the first token. The closeness of the two tokens is established by using the same CM as described above. If the CM goes above certain threshold, the second (or third) token is rejected and the user is prompted for another repetition. The overall duration threshold and in-between word silence threshold are applied before the second/third token is accepted for training. The smart training system for multiple-token is shown in FIG. 11. In multiple token training the Confidence measure is evaluated to determine the acoustic similarity of the entered word with saved models and instead of a new model being created the similar model is updated.

Referring to FIGS. 11A–11D, the second and subsequent speech words are each input after the user has designated the input to be a multiple token training session. The user initiates such training as though it were single word training, step 400. The system samples a frame of the processed speech signal, step 401, energy and the feature vector are determined, step 402. The system tests to determine if the beginning of speech flag Begin_Found has been set, step 403. If not, then the system tests the energy vector. If the energy vector exceeds a given threshold, e.g. above ambient noise, step 404. the system determines that the beginning of speech has been found and sets the Begin_Found variable, step 405. The start Begin_Found is set to 1. (It should be again noted that in typical systems, the first frame examined is well before the commencement of speech). The feature vector is saved in storage, step 406, and the next frame selected, step 407 and the process continues, step 402. If the Begin_Found variable is set, step 403, the energy is again tested, step 408. If the energy is above a threshold, (e.g. system noise) then the system knows it is still processing speech and the feature vector is saved, step 406, and the process continues with the selection of the next frame, step 407. When the energy threshold drops below a given threshold, the system knows it has been collecting speech information, and has reached the end of the speech and sets the End found to 1, step 409. Again, it should be noted that Typical systems continue to check for END for 10 to 20 frames or so to ensure that the end of speech has been encountered and that the silence is not just a pause in speech. The final feature vector is saved in storage, step 410 and the distance for each model and each state are computed, step 411 and the accumulated score is determined, step 412.

The system then computes a confidence measure, step 416, and compares the confidence measure with a threshold, step 417, based on the particular application which will render acceptable results. If the Confidence Measure is low the word being entered is confusingly similar to the nearest models and the new model for the word is used to update the existing model, step 418, and the training ends. If the Confidence Measure is high, step 421, then the user has entered a different word and the user is prompted to repeat the word, step 419. If the user selects another word, step 420, FIG. 11D, then the new word is received, step 400 and the process begins anew. If the user does not wish to enter another word, step 421, the multiple token training ends.

It is understood that the above-described embodiments are merely illustrative of the possible specific embodiments, which may represent principles of the present invention. Other arrangements may readily be devised in accordance with these principles by those skilled in the art without departing from the scope and spirit of the invention.

Having thus described the invention, what is claimed is:

1. A speech training system comprising:
   a. a first preprocessing module receiving a first speech signal and outputting a first processed speech signal and for detecting the beginning and end of said first speech signal;
   b. a first feature extraction module for extracting feature information from said first processed speech signal and outputting at least one first speech signal feature vector for said first processed speech signal;
   c. a first comparison module receiving said first speech signal feature vector and comparing the features of said first speech signal feature vector with a plurality of models stored in a storage medium;
   d. a first computing module for computing the distance for each state of each of said plurality of models on said storage medium with respect to said first speech signal feature vector and computing a score for each distance calculation and storing an accumulated score for each model;
   e. a second comparison module for comparing accumulated scores for said models to determine the top two models which are most similar to said first speech signal feature vector;
   f. a first weighting module for applying increased weighting for dissimilar portions of said most similar models and said first speech signal and marking said most similar models as similar to said first speech signal and for applying increased weighting for dissimilar portions of said first speech signal and stored models and marking said first speech signal model as most similar to each of said similar models;
   g. a first estimating module for estimating model parameters for said first speech signal; and
   h. a storage device for storing all marked model parameters.

2. A speech training system as described in claim 1 wherein said system includes a speech recognition system further comprising:
   a. a second preprocessing module for receiving a second speech signal and outputting a processed second speech signal and for detecting the beginning and end of said second speech signal;
   b. a second speech signal feature extraction module for extracting feature information from said processed second speech signal and outputting at least one second feature vector for said processed second speech signal;
   c. a third comparison module receiving said second feature vector and comparing the features of said second feature vector with a plurality of models stored in a storage medium;
   d. a second computing module for computing the distance for each state of each of said plurality of models installed on said storage medium with respect to said second feature vector and computing a score for each distance calculation and storing a second accumulated score for each model;
   e. a fourth comparison module for comparing accumulated scores for said models to determine at least the top two models which are most similar to said second speech signal;
   f. a third computing module for computing the total score of said at least top two models as a second weighed average score; and
   i. a decision logic module which evaluates said weighted average score and assigns an ID of the individual one of said at least two top two models having the highest weighted average score.

3. A speech recognition system as described in claim 2 wherein:
   a. said first and second preprocessing modules may be grouped within a module;
   b. said first, second, third and fourth comparison modules may be grouped within a module;
   c. said first and second speech signal feature extraction module may be grouped within a module; and
   d. said first, second and third computing module may be grouped within a module.

4. A speech training system as described in claim 1 wherein said system further comprises a sorting module which sorts said scores into a list such that those scores representing the models which are acoustically close to the input signal are at the top of the sort list.

5. A speech training apparatus for interactive training by a user comprising:
   a. a preprocessing module receiving a training speech signal and outputting a processed training speech signal;
   b. a feature extraction module for extracting feature information from said processed training speech signal and outputting an feature vector for the each segment of said processed speech;
   c. a comparison module for comparing each of said input feature vectors with each state of all model parameters for models stored in a storage module and accumulating said differences and assigning a score based on said differences for each stored model;
   d. a sorting module which sorts said scores into a list such that those scores representing the models which are acoustically close to the input signal are at the top of the sort list;
   e. a confidence module which uses the top scores to determine whether the top scores are sufficiently close to the input signal to represent confusion on recognition;
   and
   f. a weighting module which assigns increased weighting to dissimilar segments of the models and the training signal for use in recognition.

6. A method for processing a first signal for comparison against stored signal models having a plurality of states stored on a storage medium comprising the following steps:
   a. inputting said training signal to be processed into a preprocessing system;
   b. segregating said training signal into a plurality of time frames;
   c. deriving a plurality of training signal feature vectors each related to a frame of said training signal;
   d. saving each feature vector in storage; and computing the distance for all stored models at each state of said stored model stored on said storage medium with respect to said each of said training features vectors;
   e. accumulating a score based on said distance before evaluating the next training features vector, until the distance for all training feature vectors is accumulated;
   f. sorting said accumulated scores into a list with the scores at the top representing the closest matching models and the scores at the bottom representing the least closest matches;
   g. weighting the scores for a selected number of scores at the top of said list to emphasize the dissimilar sections of the closest models to the training signal and marking said models as close to the training signal model;
   f. partitioning the sequence of training feature vectors of said training signal into segments and weighting the scores for the training signal to emphasize the dissimilar sections from the models and marking said training model as close to the selected number of closest models;
   g. estimating an model for said training signal; and
   h. saving the training signal model in said storage medium.

7. A method for processing a training signal as described in claim 6 further comprising the following steps:
   a. setting a lower limit for said training signal duration;
   b. computing the duration of said training signal;
   c. determining if said lower duration limit is met;
   d. requesting another signal input if the lower duration limit is not met;
   e. setting an upper duration limit;
   f. determining if the duration of said training signal exceeds said upper duration limit;
   e. requesting another signal input if the lower duration limit is not met;
   g. setting a silence duration limit; and
   h. requesting another signal input if the silence duration limit is exceeded.

8. A method for processing a training signal as described in claim 7 when said lower duration limit is not met comprising the following steps:
   a. sorting said accumulated scores into a list with the scores at the top representing the closest matching models and the scores at the bottom representing the least closest matches;
   b. weighting the scores for a selected number of scores at the top of said list to emphasize the dissimilar sections of the closest models to the training signal and marking said models as close to the training signal model;
   c. partitioning the sequence of feature vectors of said training signal into segments and weighting the scores for the training signal to emphasize the dissimilar sections from the models and marking said training model as close to the selected number of closest models;
   d. estimating an model for said training signal; and
   e. saving the training signal model in said storage medium.

9. A method for processing a training signal as described in claim 7 when said upper duration limit is not met comprising the following steps:
   a. sorting said accumulated scores into a list with the scores at the top representing the closest matching models to said training signal and the scores at the bottom representing the least closest matches;
   b. weighting the scores for a selected number of scores at the top of said list to emphasize the dissimilar sections of the closest models to the training signal and marking said models as close to the training signal model;
   c. partitioning the sequence of training feature vectors of said training signal into segments and weighting the scores for the training signal to emphasize the dissimilar sections from the models and marking said training model as close to the selected number of closest models;

d. estimating an model for said training signal; and e. saving the training signal model in said storage medium.

10. A method for processing a training signal as described in claim 7 when said silence duration limit is exceeded comprising the following steps:

a. truncating said silence duration of said training signal to less than the selected limit;

b. sorting said accumulated scores into a list with the scores at the top representing the closest matching models to said training signal and the scores at the bottom representing the least closest matches;

c. weighting the scores for a selected number of scores at the top of said list to emphasize the dissimilar sections of the closest models to the training signal and marking said models as close to the training signal model;

d. partitioning the sequence of feature vectors of said training signal into segments and weighting the scores for the training signal to emphasize the dissimilar sections from the models and marking said training model as close to the selected number of closest models;

e. estimating an model for said training signal; and f. saving the training signal model in said storage medium.

11. A speech processing method for processing an input digital speech signal and comparing such signal against stored models comprising the following steps:

a. generating feature vectors representative of said input speech;

b. evaluating said feature vectors until the start of speech is found;

c. calculating the distance for each of the feature vectors against each of the stored models for each state of said models;

d. computing an total accumulated score for said distance calculations for said feature vectors against said stored models;

e. arranging scores in descending order;

f. re-computing all of the distances for the input feature vectors and accumulating a score for the close scores using a weighted measure which applies a higher weighting to dissimilar states of each model than is applied to similar states;

g. arranging the recomputed close scores in descending order; and h. assigning an I.D. to the input word based on the highest score.

* * * * *